US012625986B2

(12) United States Patent
Konishi et al.

(10) Patent No.: US 12,625,986 B2
(45) Date of Patent: May 12, 2026

(54) INFORMATION PROCESSING METHOD AND INFORMATION PROCESSING SYSTEM

(71) Applicant: Panasonic Intellectual Property Corporation of America, Torrance, CA (US)

(72) Inventors: Kazunobu Konishi, Osaka (JP); Taro Suzuki, Ibaraki (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 153 days.

(21) Appl. No.: 18/370,221

(22) Filed: Sep. 19, 2023

(65) Prior Publication Data

US 2024/0005015 A1     Jan. 4, 2024

Related U.S. Application Data

(63) Continuation of application No. PCT/JP2022/004617, filed on Feb. 7, 2022.

(30) Foreign Application Priority Data

Mar. 22, 2021     (JP) ................................. 2021-047438

(51) Int. Cl.
G06F 21/62          (2013.01)
(52) U.S. Cl.
CPC ................................ G06F 21/6209 (2013.01)
(58) Field of Classification Search
CPC ................................................. G06F 21/6209
See application file for complete search history.

(56) References Cited

U.S. PATENT DOCUMENTS 9,571,498 B1 *   2/2017   Glick ...................... H04L 63/10
2014/0123309 A1 *   5/2014   Jung ................... G06F 21/6254
726/27

(Continued)

FOREIGN PATENT DOCUMENTS

JP          2001-251312          9/2001

OTHER PUBLICATIONS

International Seach Report issued in International Patent Application No. PCT/JP2022/004617, dated May 10, 2022, along with an English translation thereof.

*Primary Examiner* — Vance M Little
(74) *Attorney, Agent, or Firm* — Greenblum & Bernstein, P.L.C.

(57)          ABSTRACT

A server includes: a first receiving part that receives, from an appliance arranged in a building, operational data of the appliance; a second receiving part that receives use request information indicating a use request for the appliance from a user terminal belonging to a user of the appliance; a transmitting part that transmits approval request information to an owner terminal belonging to an owner of the appliance in response to receipt of the use request information; a third receiving part that that receives, from the owner terminal, approval information indicating an approval to use of the appliance; and a setting part that sets a restriction on access to appliance data by the owner in response to receipt of the approval information, the appliance data including at least one of the operational data and data based on the operational data.

8 Claims, 17 Drawing Sheets

(56)  References Cited

U.S. PATENT DOCUMENTS

2016/0072821 A1\* 3/2016 Wu ..................... H04L 63/0869
726/4
2016/0323548 A1\* 11/2016 Khot ................... G06F 3/04842
2021/0383020 A1\* 12/2021 Sofia .................... G06F 21/602

\* cited by examiner

FIG.2

211: APPLIANCE DATA DB

| APPLIANCE ID | TYPE | ACCESS RIGHT | VALUE | |
|---|---|---|---|---|
| A1 | ARRANGEMENT INFORMATION | OWNER O1,USER U1 | | 2111 |
| A1 | OPERATIONAL DATA | USER U1 | | |
| A1 | STATISTIC DATA | OWNER O1,USER U1 | | |
| A5 | ARRANGEMENT INFORMATION | OWNER O2 | | |
| A5 | OPERATIONAL DATA | OWNER O2 | | |
| A5 | STATISTIC DATA | OWNER O2 | | |

FIG.3

212: APPLIANCE MANAGEMENT DB

| APPLIANCE ID | BUILDING ID | OWNER ID | USER ID | |
|---|---|---|---|---|
| A1 | H1 | O1 | U1 | 2121 |
| A2 | H1 | O1 | U1 | |
| A3 | H1 | O1 | U1 | |
| A4 | H2 | O2 | O2 | |
| A5 | H2 | O2 | O2 | |

FIG.5

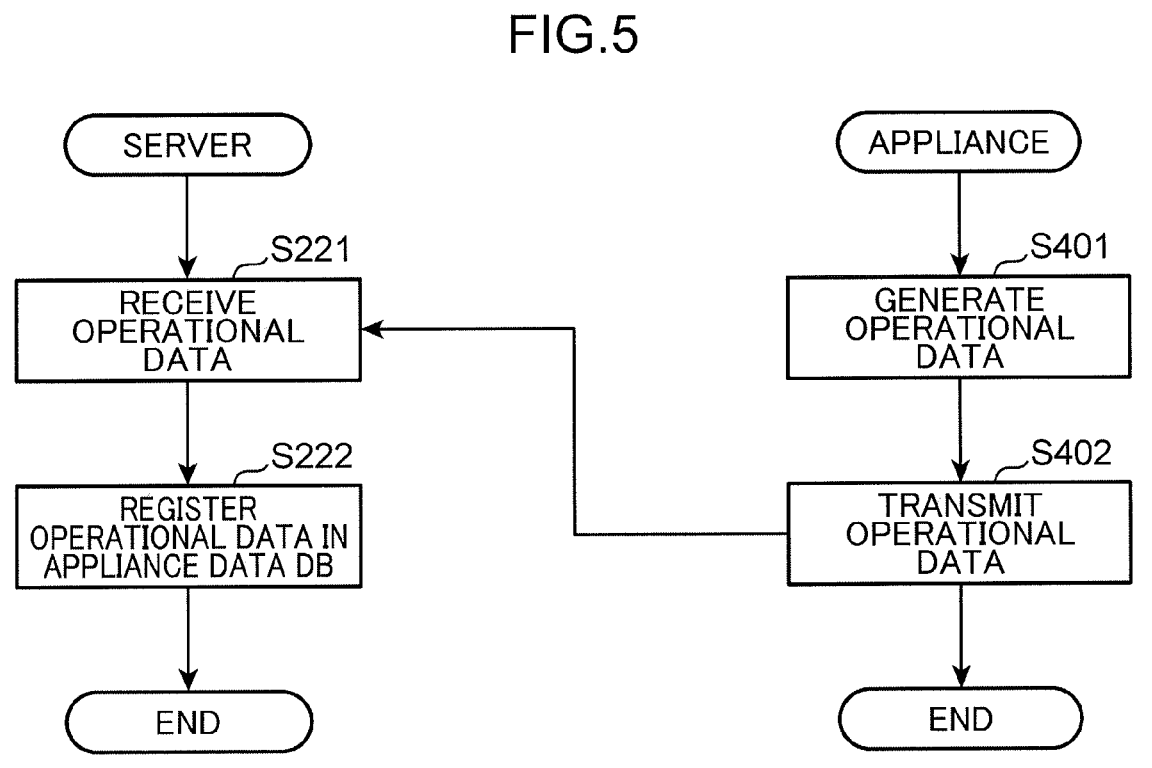

```
   ┌──────────┐                              ┌──────────┐
   │  SERVER  │                              │ APPLIANCE│
   └────┬─────┘                              └────┬─────┘
        │                                         │
        │      S221                               │      S401
   ┌────▼─────────┐                          ┌────▼─────────┐
   │   RECEIVE    │◄──────────────┐          │  GENERATE    │
   │ OPERATIONAL  │               │          │ OPERATIONAL  │
   │    DATA      │               │          │    DATA      │
   └────┬─────────┘               │          └────┬─────────┘
        │                         │               │
        │      S222               │               │      S402
   ┌────▼─────────────┐           │          ┌────▼─────────┐
   │    REGISTER      │           │          │  TRANSMIT    │
   │OPERATIONAL DATA IN│          └──────────│ OPERATIONAL  │
   │ APPLIANCE DATA DB │                     │    DATA      │
   └────┬─────────────┘                      └────┬─────────┘
        │                                         │
   ┌────▼─────┐                              ┌────▼─────┐
   │   END    │                              │   END    │
   └──────────┘                              └──────────┘
```

FIG.9

212A: APPLIANCE MANAGEMENT DB

| APPLIANCE ID | BUILDING ID | OWNER ID | USER ID | BULK OR NON-BULK |
|---|---|---|---|---|
| A1 | H1 | O1 | U1 | BULK |
| A2 | H1 | O1 | U1 | BULK |
| A3 | H1 | O1 | U1 | BULK |
| A4 | H2 | O2 | O2 | |
| A5 | H2 | O2 | O2 | |

Figure 16:
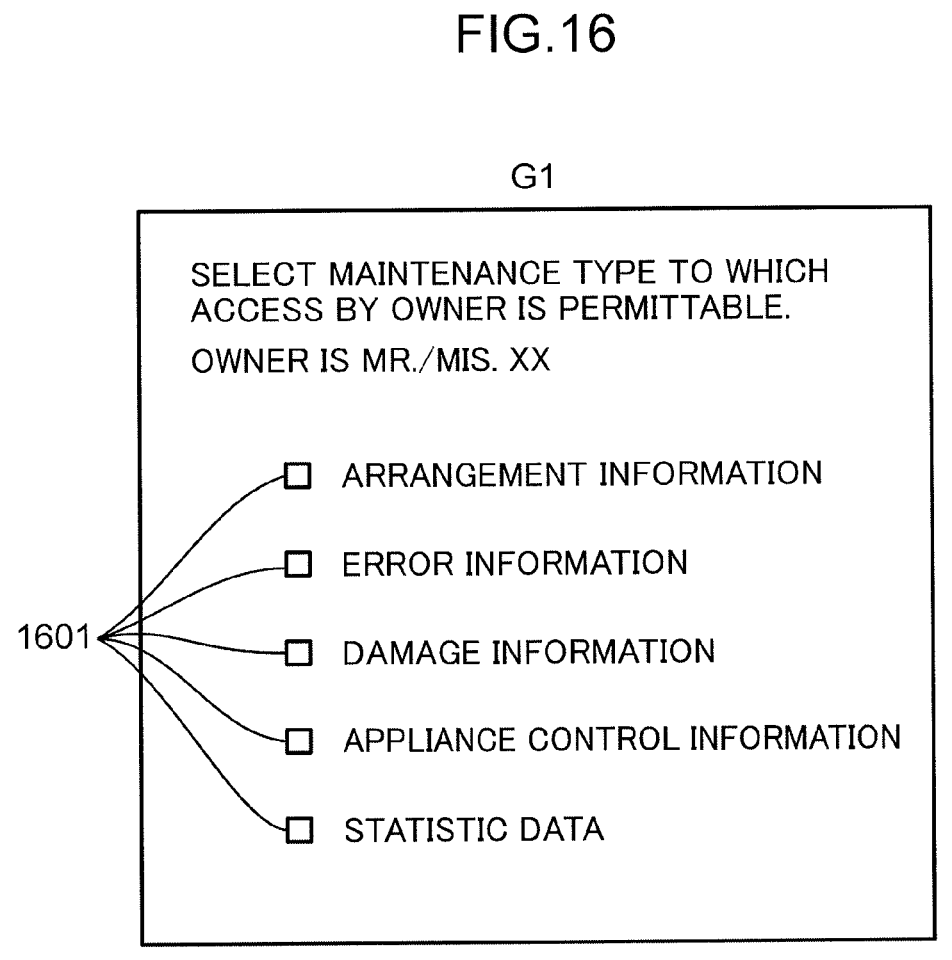

SELECT MAINTENANCE TYPE TO WHICH
ACCESS BY OWNER IS PERMITTABLE.

OWNER IS MR./MIS. XX

1601

☐ ARRANGEMENT INFORMATION

☐ ERROR INFORMATION

☐ DAMAGE INFORMATION

☐ APPLIANCE CONTROL INFORMATION

☐ STATISTIC DATA

Figure 18:
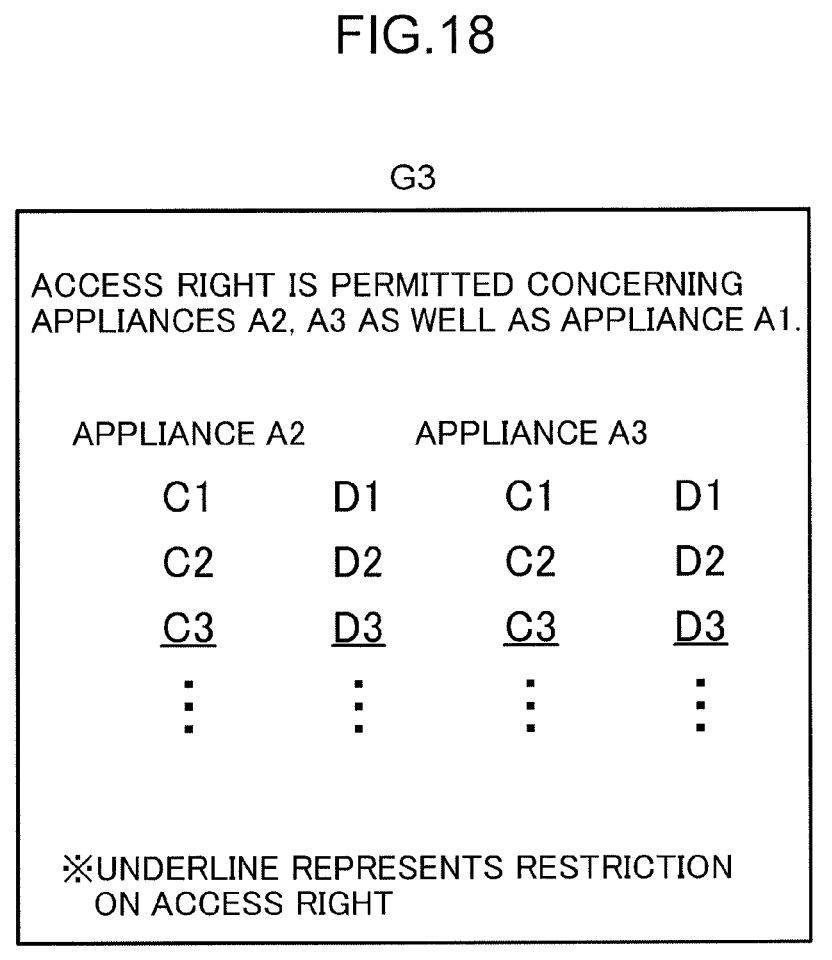

ACCESS RIGHT IS PERMITTED CONCERNING
APPLIANCES A2, A3 AS WELL AS APPLIANCE A1.

APPLIANCE A2  APPLIANCE A3

C1  D1  C1  D1
C2  D2  C2  D2
C3  D3  C3  D3
⋮   ⋮   ⋮   ⋮

※UNDERLINE REPRESENTS RESTRICTION
ON ACCESS RIGHT

INFORMATION PROCESSING METHOD AND INFORMATION PROCESSING SYSTEM

FIELD OF INVENTION

This disclosure relates to a technology of managing an appliance arranged in a building.

BACKGROUND ART

Patent Literature 1 discloses a technology of giving a restriction on access to an appliance from a manipulation terminal of a user in accordance with a type of the user or a place where the user is by providing an access management table having access permission information per appliance unit for each user in a home network.

However, the technology of Patent Literature 1 fails to suppose a case where the user of the appliance connected to the home network is not an owner of the appliance. In this regard, a drawback is seen in unconditionally providing the owner of the appliance with appliance data about the user, which results in failure to protect the privacy of the user.
Patent Literature 1: Japanese Unexamined Patent Publication No. 2001-251312

SUMMARY OF THE INVENTION

This disclosure has been achieved to solve the drawback, and has an object of providing a technology for protecting a privacy of a user even in a case where the user who uses an appliance arranged in a building is not an owner of the appliance.

An information processing method according to an aspect of the disclosure, by a computer, includes: receiving, from an appliance arranged in a building, operational data of the appliance; receiving use request information indicating a use request for the appliance from a user terminal belonging to a user of the appliance; transmitting approval request information to an owner terminal belonging to an owner of the appliance in response to receipt of the use request information; receiving, from the owner terminal, approval information indicating an approval to use of the appliance; and setting a restriction on access to appliance data by the owner in response to receipt of the approval information, the appliance data including at least one of the operational data and data based on the operational data.

This disclosure enables protection of the privacy of the user even in a case where the user who uses the appliance in the building is not the owner of the appliance.

BRIEF DESCRIPTION OF THE DRAWINGS

FIG. 2 shows an example of a data configuration of an appliance data DB.
FIG. 3 shows an example of a data configuration of an appliance management DB.
FIG. 5 is a flowchart showing an example of a process by the appliance management system when a server receives operational data.

FIG. 9 shows an example of a data configuration of an appliance management DB in the second embodiment.
FIG. 16 shows a display screen image of permission request information.
FIG. 18 shows a display screen image displayed on a display of a user terminal to present a detailed type determined concerning other appliance to the user.

DETAILED DESCRIPTION

Figure 1:
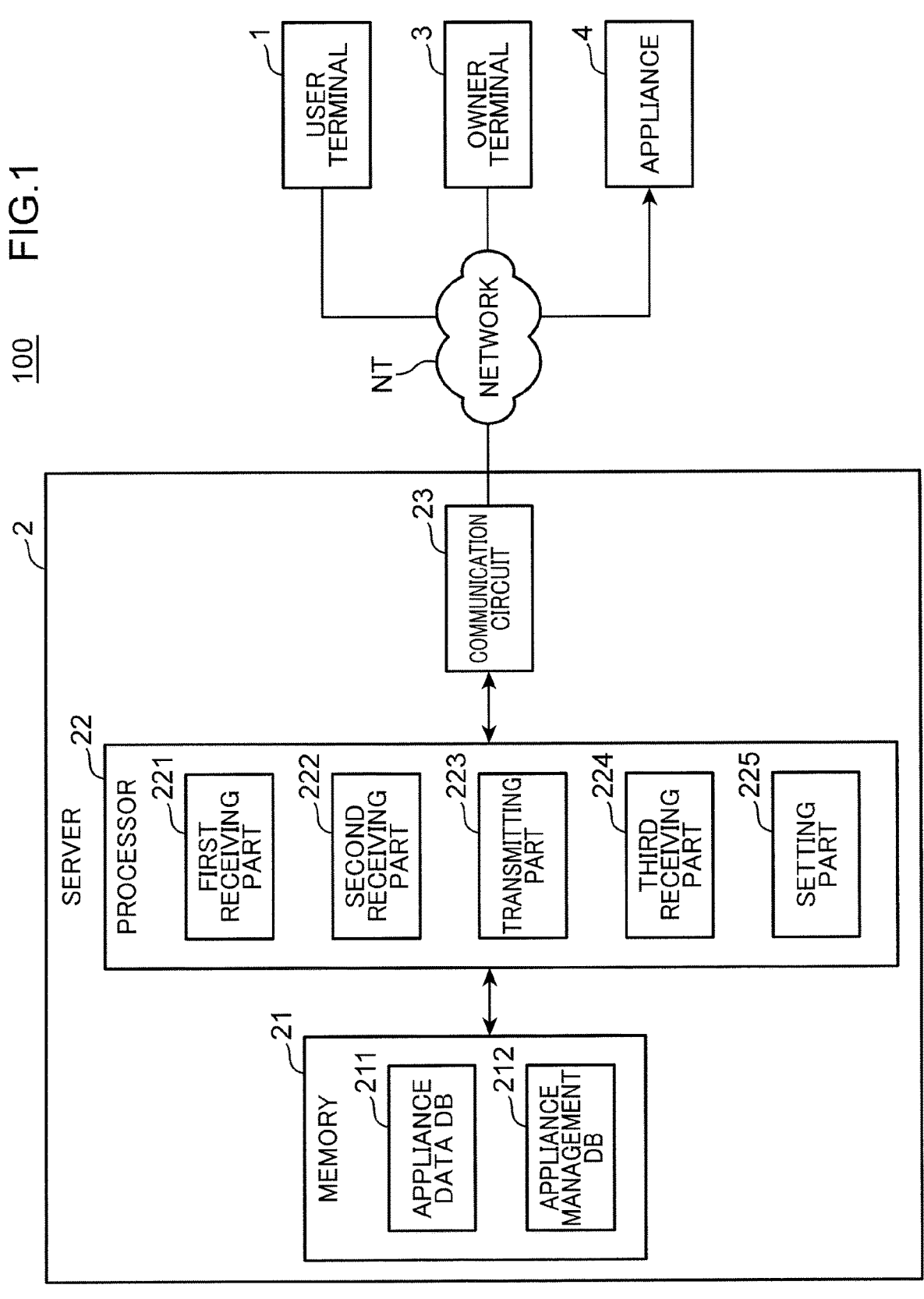
FIG. 1 is a block diagram showing an example of a configuration of an appliance management system in a first embodiment.

Circumstances Led Up to this Disclosure
A rental service for renting a building, such as a house or a room, provided with an appliance to a tenant (user) has been generally known. In such a rental service, a landlord (owner) who rents a building provides a service to a tenant (user) while managing a plurality of appliances arranged in the building. Here, examples of the managed appliances include electric products and house equipment each having communicability, and are so called IOT (Internet of Things) devices.

In the rental service, the owner has a responsibility for maintenance and damage handling of the provided appliances. The user can receive various services including: maintenance of an appliance by using appliance data, such as daily operational data of the appliance; and automation about a repair request for a damage, by providing the owner with the appliance data. That is, the user is required to provide the owner with the appliance data for the services.

However, a drawback is seen in providing even appliance data undesired by the user to be exposed to the owner when all the appliance data is unconditionally provided to the owner, which results in failure to protect the privacy of the user about the lifestyle thereof.

Patent Literature 1 discloses giving a restriction on access to an appliance by the user in accordance with a type of the user and a place where the user executes manipulation, but does not suppose a case where the user who uses the appliance is not the owner of the appliance, and thus fails to disclose a restriction on access to the appliance by the owner. In this respect, Patent Literature 1 cannot protect the privacy of the user since the access to the appliance data by the owner is permitted.

This disclosure has been achieved to solve the drawback described above, and aspects of this disclosure will be described below.

An information processing method according to an aspect of the disclosure, by a computer, includes: receiving, from an appliance arranged in a building, operational data of the appliance; receiving use request information indicating a use request for the appliance from a user terminal belonging to a user of the appliance; transmitting approval request information to an owner terminal belonging to an owner of the appliance in response to receipt of the use request information; receiving, from the owner terminal, approval information indicating an approval to use of the appliance; and setting a restriction on access to appliance data by the owner in response to receipt of the approval information, the appliance data including at least one of the operational data and data based on the operational data.

According to this configuration, a restriction on access to appliance data by the owner is set in response to receipt of the approval information by the owner terminal, the appliance data including at least one of the operational data and data based on the operational data. This configuration therefore achieves protection of the privacy of the user by preventing the appliance data from being unconditionally provided to the owner.

Moreover, according to the configuration, approval request information is transmitted to the owner terminal in response to receipt of the use request information about the appliance from the user terminal, and the approval information about use of the appliance is received from the owner terminal. In this manner, it is possible to keep the user having no approval of the owner from using the appliance.

In the information processing method, the restriction on access may include setting permission of access to the appliance data by the user.

According to this configuration, permission of access to the appliance data by the user is set, and thus, the user can confirm the lifestyle thereof and check a use state of the appliance from the appliance data.

In the information processing method, the data based on the operational data may include statistical data based on the operational data, and the restriction on access may include permission of access solely to the statistical data of the operational data and the statistical data by the owner.

This configuration gives permission of access solely to the statistical data by the owner without providing the operational data of the appliance itself to the owner. Hence, the privacy of the user is protectable. Moreover, the owner can manage the appliance owing to the statistical data provided thereto.

In the information processing method, the approval information may include first approval information about use of the appliance and second approval information about use of other appliance arranged in the building except for the appliance directed to the use request, and, when use request information about the other appliance is received after the approval information including the second approval information is received, a restriction on access to the other appliance may be set without transmitting approval request information about the other device.

According to this configuration, the approval information includes the first approval information about use of the appliance and the second approval information about use of other appliance arranged in the building except for the appliance directed to the use request. In this regard, the owner can approve use of the other appliance together with the appliance directed to the use request from the user in a bulk manner in accordance with an approval based on the second approval information.

Moreover, when use request information about the other appliance is received after the approval information including the second approval information is received, a restriction on access to the other appliance by the owner is settable without transmitting approval request information about the other device to the owner terminal.

In the information processing method, the transmission of the approval request information may include transmitting a list including the other appliance to the owner terminal, and the list including the other appliance may be presented to the owner via the owner terminal.

According to this configuration, the list including the other appliance is presented to the owner, and thus, the owner can grasp the other appliance for a bulk approval.

The information processing method may further include: receiving demand information about a list including the appliance from the user terminal; transmitting the list including the appliance to the user terminal in response to the demand information; presenting the list including the appliance to the user via the user terminal; and receiving, when receiving the use request information, use request information about an appliance included in the list including the appliance.

According to this configuration, the list including the appliance is presented to the user, and thus, the user can make a use request for appliances included in the list including the appliance in a bulk manner.

The information processing method may further include: transmitting a type of data contained in the appliance data to the user terminal; presenting the type to the user via the user terminal; receiving, from the user terminal, a permission setting type which is a type of data, among types of data, to which access by the owner is permitted; and setting the restriction on access to the appliance data by the owner in accordance with the permission setting type.

According to this configuration, a type of data contained in the appliance data is presented to the user, and the permission setting type which is a type of data, among presented types of data, to which access by the owner is permitted is received from the user terminal. In this way, the user can set a type of data, among the presented types of data, to permit access thereto by the owner.

In the information processing method, the type transmitted to the user terminal may include a type of data which is in the appliance data and to which access by the owner is permitted.

According to this configuration, the user can set a type of data to permit access thereto by the owner among the types of data to which access by the owner is permitted.

In the information processing method, the permission setting type may include a maintenance type which is a type of data for use in maintenance of the appliance, and the restriction on access may include permission of access to the data of the maintenance type by the owner.

According to this configuration, the user can set whether to permit access to the data of the maintenance type by the owner.

The information processing method may further include: determining an incentive to be given to the user in accordance with the permission of the access to the data of the maintenance type by the owner; transmitting the incentive to the user terminal; and presenting the incentive to the user via the user terminal.

This configuration gives an incentive to the user in accordance with the permission of the access to the data of the maintenance type by the owner, and therefore, can motivate the user to permit access to the data by the owner. Consequently, the owner has an increased possibility of having permission of access to the data of the maintenance type, and thus attains facilitated management of the appliance.

The information processing method may further include: receiving the permission setting type from the user terminal; and setting, in accordance with the permission setting type, a restriction on access to appliance data of the other appliance by the owner, the other appliance being arranged in the building except for the appliance directed to the use request.

According to this configuration, a restriction on access to the other appliance by the owner is set in accordance with the permission setting type set for the appliance directed to the use request, and hence, the setting of the permission setting type of the appliance directed to the use request is applicable to the other appliance as well. As a result, setting of the permission setting type is executable in a bulk manner.

An information processing system according to another aspect includes: a first receiving part that receives, from an appliance arranged in a building, operational data of the appliance; a second receiving part that receives use request information indicating a use request for the appliance from a user terminal belonging to a user of the appliance; a transmitting part that transmits approval request information to an owner terminal belonging to an owner of the appliance in response to receipt of the use request information; a third receiving part that receives, from the owner terminal, approval information indicating an approval to use of the appliance; and a setting part that sets a restriction on access to appliance data by the owner in response to receipt of the approval information, the appliance data including at least one of the operational data and data based on the operational data.

This disclosure can be realized as an information processing program for causing a computer to execute each distinctive feature included in such an information processing method. Additionally, it goes without saying that the computer program is distributable as a non-transitory computer readable storage medium like a CD-ROM, or distributable via a communication network like the Internet.

Each of the embodiments which will be described below represents a specific example of the disclosure. Numeric values, shapes, constituent elements, steps, and the order of the steps described below in each embodiment are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

FIG. 1 is a block diagram showing an example of a configuration of an appliance management system 100 in a first embodiment. The appliance management system 100 includes a user terminal 1, a server 2 (which is an example of the information processing system), an owner terminal 3, and an appliance 4. The user terminal 1 to the appliance 4 are communicably connected to one another via a network NT. The network NT includes, for example, a wide area network having an internet communication network and a mobile phone communication network.

The user terminal 1 includes a mobile terminal, e.g., a smartphone and a tablet computer, or a stationary personal computer. Specifically, the user terminal includes a processor like a CPU, a memory, an input device, a display, and a communication circuit. The user terminal 1 is, for example, owned by a user. The user is, for example, a resident of a building where the appliance 4 is arranged.

The owner terminal 3 includes a mobile terminal, e.g., a smartphone and a tablet computer, or a stationary personal computer. Specifically, the owner terminal 3 includes a processor like a CPU, a memory, an input device, a display, and a communication circuit. The owner terminal 3 is owned by an owner. The owner is, for example, an owner of the building where the appliance 4 is arranged. The owner owns other appliances arranged in the building as well.

Examples of the building include a rental apartment and a rental house rented to the user by the owner.

The appliance 4 includes electric products and house equipment arranged in the building. The appliance 4 includes IOT devices connectable to the network NT via a communication circuit. The owner rents the appliance 4 to the user as well. The electric products include, for example, a refrigerator, a television, a washing machine, a microwave oven, an oven, and recorder. The house equipment includes, for example, a hot water system, an air conditioner, and a floor heating system.

The server 2 includes, for example, a cloud server having one or more computers. The server 2 includes a memory 21, a processor 22, and a communication circuit 23. The memory 21 includes a storage device, such as a solid state drive or a hard disk drive. The memory 21 has an appliance data DB (database) 211 and an appliance management DB (database) 212.

FIG. 2 shows an example of a data configuration of the appliance data DB 211. The appliance data DB 211 includes a plurality of records each storing appliance data 2111. The appliance data 2111 includes log data of the appliance 4. Specifically, the appliance data 2111 includes an appliance ID, a type, an access right, and a value.

The appliance ID is an identifier of the appliance 4 and includes, for example, a serial number of the appliance 4. The type represents information about a type of the appliance data 2111 registered in a corresponding record. The type of the appliance data 2111 includes arrangement information, operational data, and statistical data.

The arrangement information includes, for example, a model number, an arrangement position, an arrangement date and time about the appliance 4. The operational data is unprocessed log data directly acquired from the appliance 4, and includes, for example, error information, damage information, appliance control information, and manipulation history information. The statistical data is processed log data obtained by statistically processing the operational data, and includes, for example, the average number of operations and average consumptive electric power in a predetermined period. The operational data being the unprocessed log data may be related to the privacy of the user whose lifestyle is specifiable from the data. By contrast, the statistical data being statically processed log data makes it difficult to specify the lifestyle of the user therefrom. Here, of the operational data and the data based on the processed operational data, the data related to the privacy of the user is referred to as use data as well.

An access right field has storage of an owner ID of the owner and a user ID of the user each having a right to use the appliance data 2111 registered in the corresponding record. The use of the appliance data 2111 includes, for example, browse of the appliance data 2111. The owner ID is an identifier of the owner, and includes, for example, at least one of the name of the owner and a preset password. The user ID is an identifier of the user, and includes, for example, at least one of the name of the user and a preset password.

For instance, the appliance data 2111 in the first row shows that each of an owner O1 (owner having an owner ID "O1") and a user U1 (user having a user ID "U1") has an access right for arrangement information about an appliance A1 (appliance 4 having an appliance ID "A1"). By contrast, the appliance data 2111 in the second row shows that the user U1 has an access right but the owner O1 has no access right for operational data of the appliance A1.

A value field has storage of a value indicating detailed contents of the appliance data 2111 registered in the corresponding record. For instance, when the type of the appliance data 2111 indicates arrangement information, the value field has storage of the model number, the arrangement position, and the arrangement date and time. Besides, when the type of the appliance data 2111 indicates the operational data, the value field has storage of unprocessed log data showing that "Power source is turned on at 18:00:00, on Feb. 1, 2021" and "Set temperature is changed to 24 degrees at 18:01:00, on Feb. 1, 2021", and an acquisition date and time. Moreover, when the type of the appliance data 2111 indicates the statistical data, the value field has storage of statically processed log data, for example, average consumptive electric power per month or average consumptive electric power per year, and a calculation date and time.

FIG. 3 shows an example of a data configuration of the appliance management DB 212. The appliance management DB 212 includes a plurality of records storing appliance management information 2121. The appliance management information 2121 represents a relation among the building where each appliance 4 is arranged, the owner of the appliance, and the user thereof. Specifically, the appliance management information 2121 includes an appliance ID field, a building ID field, an owner ID field, and a user ID field. An appliance ID, an owner ID, and a user ID are equivalent to those in the appliance data DB 211. A building ID is an identifier of the building, and includes, for example, the name of the building and the address thereof.

For instance, the appliance management information 2121 in the first row shows that the appliance A1 is arranged in a building H1 (building having the ID "H1"), owned by the owner O1, and used by the user U1.

Referring back to FIG. 1, the processor 22 includes an integrated circuit, such as a CPU. The processor 22 has a first receiving part 221, a second receiving part 222, a transmitting part 223, a third receiving part 224, and a setting part 225.

The first receiving part 221 receives, from the appliance 4 arranged in the building, operational data of the appliance 4 by using the communication circuit 23. The first receiving part 221 stores the received operational data in the appliance data DB 211 as new operational data 2111. In this case, the first receiving part 221 may register the appliance ID contained in the head of the received operational data in the appliance ID field, register information about the operational data in the type filed, register the owner ID of the owner or the user ID of the user having an access right for the operational data in the access right field, and register a value of the operational data in the value field.

The second receiving part 222 receives use request information indicating a use request for the appliance 4 from the user terminal 1 belonging to the user of the appliance 4 by using the communication circuit 23. Such a use request is made by a user who has no access right to obtain an approval of the owner of the appliance 4 to use of the appliance. The use request information includes, for example, the user ID and the appliance ID.

The transmitting part 223 transmits approval request information to the owner terminal 3 belonging to the owner of the appliance 4 by using the communication circuit 23 in response to receipt of the use request information by the second receiving part 222. Such approval request information is intended to notify the owner of a use request made by a certain user for the appliance 4 owned by the owner. Here, the transmitting part 223 acquires, from the appliance management DB 212, the owner ID of the owner of the appliance 4 indicated by the appliance ID included in the use request information, and transmits the approval request information to the owner terminal 3 indicated by the acquired owner ID.

The third receiving part 224 receives approval information indicating an approval to use of the appliance 4 from the owner terminal 3 by using the communication circuit 23. The approval information indicates the approval of the owner to the requested use of the appliance 4 directed to the use request made by the user. The approval information includes the appliance ID of the appliance 4 having been approved, the owner ID of the owner having approved, and the user ID of the user having been approved.

The setting part 225 sets an access right of each of the owner and the user for the appliance data 2111 in response to receipt of the approval information by the third receiving part 224. The setting of the access right includes a restriction on access by the owner, and permission of access by the user.

Specifically, the setting part 225 sets, on the basis of a predetermined setting rule, an access right of each of the owner and the user for each type of the appliance data 2111 of the appliance 4 directed to the use request. Adoptable examples of the setting rule include a rule that access to the appliance data 2111 indicating the type of arrangement information and the appliance data 2111 indicating the type of statistical data by each of the owner and the user is permitted, and access to the appliance data 2111 indicating the type of operational data by the owner is restricted and access thereto by the user is permitted. Alternatively, the access right of each of the owner and the user may be determined on the basis of the set content input into the owner terminal 3 by the owner at the time of giving an approval. Here, access to the use data, in place of the access to the operational data, by the owner may be restricted.

The communication circuit 23 connects the server 2 to the network NT. For instance, the communication circuit 23 receives use request information, transmits approval request information, and receives approval information.

Figure 4:
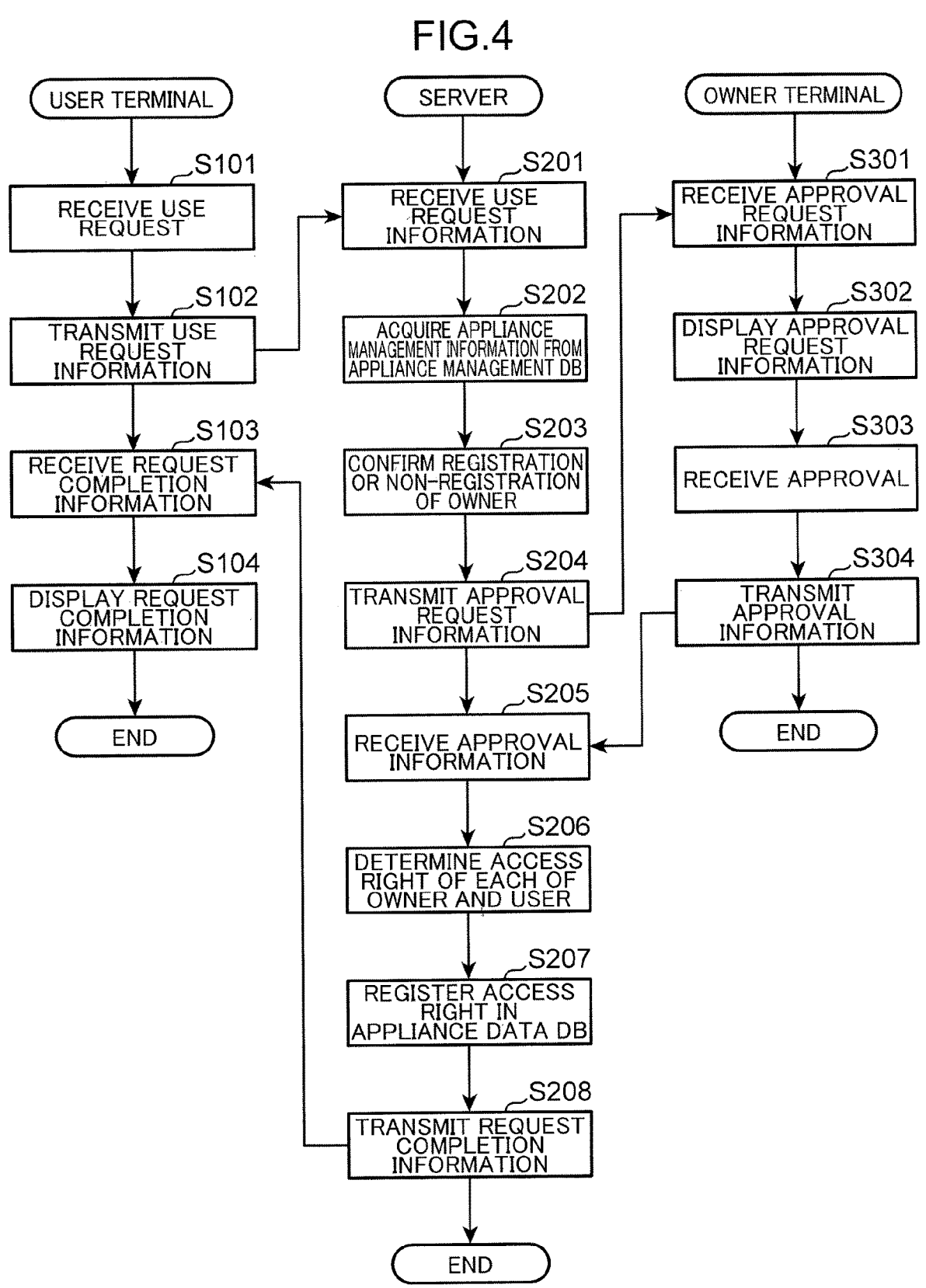
FIG. 4 is a flowchart showing an example of a process by the appliance management system in the first embodiment.

FIG. 4 is a flowchart showing an example of a process by the appliance management system 100 in the first embodiment. Described as an example here is a case where the user U1 makes a use request for the appliance A1 owned by the owner O1.

In step S101, the user terminal 1 receives an input of the use request for the appliance A1 from the user U1. For instance, the user U1 may activate an application of the appliance management system 100 through the user terminal 1 to display a use request screen image on the display thereof, and input the use request by inputting necessary matters thereto. The necessary matters include at least the user ID of the user U1 and the appliance ID of the appliance A1. For instance, the user U1 may input the appliance ID by photographing a QR code (registered trademark) attached to a housing of the appliance A1 by a camera included in the user terminal 1.

In step S102, the user terminal 1 generates, on the basis of the input use request, use request information, and transmits the generated use request information to the server 2.

In step S201, the second receiving part 222 of the server 2 receives the use request information. In step S202, the transmitting part 223 acquires, from the appliance management DB 212, appliance management information 2121 about the appliance A1 directed to the use request. In step S203, the transmitting part 223 confirms whether the acquired appliance management information 2121 has registration of the owner ID. Here, it is presumed that "O1" is registered as the owner ID. For instance, the appliance management information 2121 has no registration of an owner ID for a certain appliance 4 purchased by the user. Moreover, a user ID field for the appliance management information 2121 acquired at this stage shows blank or registration of a user ID of a previous user having used the appliance A1. When the use request from the user U1 is approved, the user ID field showing blank or the registration of the user ID of the previous user is updated to indicate the user ID "U1".

In step S204, the transmitting part 223 transmits approval request information including: the owner ID "O1" and the building ID "H1" included in the acquired appliance management information 2121; and the user ID "U1" and the appliance ID "A1" included in the use request information to the owner terminal 3 indicated by the owner ID.

In step S301, the owner terminal 3 receives the approval request information. In step S302, the owner terminal 3 displays the approval request information on the display thereof. The displayed approval request information includes, for example, the user ID "U1", the appliance ID "A1", and the building ID "H1".

In step S303, the owner terminal 3 receives an input of an approval from the owner O1. Here, the owner O1 browses display contents of the displayed approval request information, and determines whether the user is valid. When the user is determined as valid, the owner O1 inputs an approval to the owner terminal 3. Contrarily, when the user is determined as invalid, the owner O1 inputs a refusal to the owner terminal 3. When the refusal is input, information indicating the refusal against the use request is transmitted to the user terminal 1 of the user U1 via the server 2. Moreover, at the input of the approval, the owner O1 may input an access right of each of the owner and the user for each type of the appliance data 2111.

In step S304, the owner terminal 3 having received the input of the approval transmits approval information to the server 2. When the owner O1 inputs the access right of each of the owner O1 and the user U1 at the input of the approval, the approval information includes a set content having been input.

In step S205, the third receiving part 224 of the server 2 receives the approval information. In step S206, the setting part 225 determines an access right of each of the owner O1 and the user U1. Here, the access right of each of the owner and the user for each type of the appliance data 2111 is determined in accordance with the above-described setting rule. When the owner O1 inputs the access right of each of the owner and the user for each type of the appliance data 2111 at the input of the approval, the setting part 225 may determine the access right of each of the owner and the user for each type of the appliance data 2111 in accordance with the set content having been input.

In step S207, the setting part 225 registers the determined access right in the appliance data DB 211. For instance, concerning the appliance A1, the setting part 225 registers the owner O1 and the user U1 in the access right field for the arrangement information and the statistical data, and registers only the user U1 in the access right field for the operational data. This results in achieving restriction on browse of the operational data by the owner O1 and protection of the privacy of the user. Furthermore, the owner O1 can appropriately manage the appliance A1 by browsing the arrangement information and the statistical data. In addition, the user U1 can confirm the lifestyle thereof by browsing the operational data, the arrangement information, and the statistical data.

In step S208, the setting part 225 transmits request completion information to the user terminal 1 of the user U1. The request completion information is intended to notify the user of the approval of the owner to the use request.

In step S103, the user terminal 1 receives the request completion information. In step S104, the user terminal 1 displays the request completion information on the display. The displayed request completion information includes the approved appliance ID. Consequently, the user U1 can confirm the approval to the use of the appliance A1.

FIG. 5 is a flowchart showing an example of a process by the appliance management system 100 when the server 2 receives operational data.

In step S401, the appliance 4 generates operational data. For instance, the appliance 4 may periodically generate the operational data, or generate the operational data on an occurrence of a certain event. The event is triggered to occur due to, for example, a change in the set content through a manipulation by the user to the appliance 4 or a change by the appliance 4 itself. In step S402, the appliance 4 transmits the operational data to the server 2.

In step S221, the first receiving part 221 of the server 2 receives the operational data. In step S222, the first receiving part 221 registers the operational data in the appliance data DB 211 as the appliance data 2111. In the registration of the appliance data 2111 in the appliance data DB 211, the first receiving part 221 may cause the appliance data 2111 to include the access right of each of the user and the owner as set by the setting part 225.

The first receiving part 221 may calculate statistical data from the operational data, for example, at an increase in a stored amount of the operational data by a predetermined amount or at an equal interval, and register the calculated statistical data in the appliance data DB 211 as the appliance data 2111. When receiving the arrangement information, the first receiving part 221 may register the arrangement information in the appliance data DB 211 as the appliance data 2111. The arrangement information is transmitted from the appliance 4, for example, at initial registration of the appliance 4. The initial registration of the appliance 4 is executed, for example, when the appliance 4 is arranged in the building. The process in FIG. 5 as described heretofore is repeated to store the appliance data 2111 in the appliance data DB 211.

Figure 6:
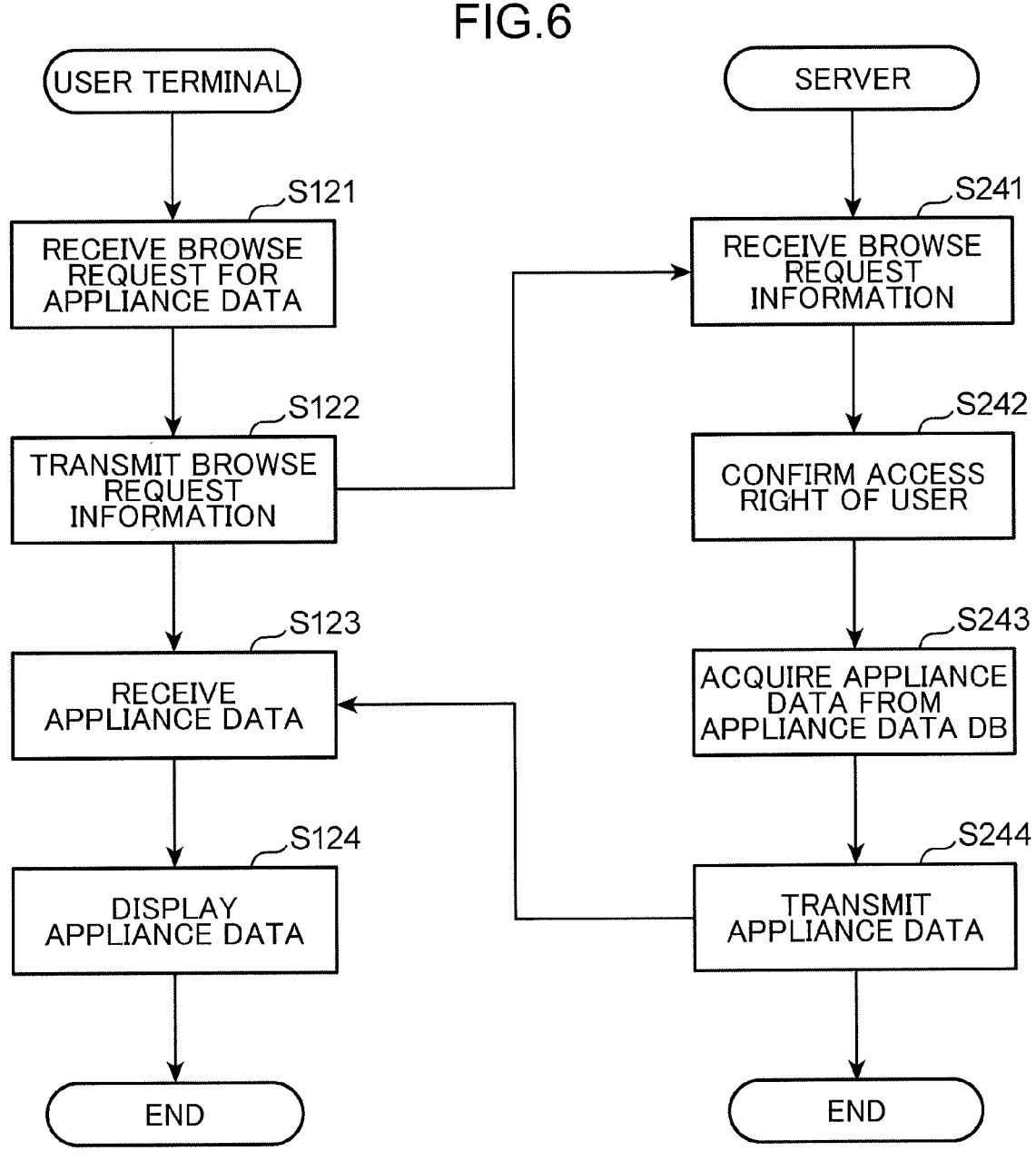
FIG. 6 is a flowchart showing an example of a process by the appliance management system when a user makes a browse request to the server.

FIG. 6 is a flowchart showing an example of a process by the appliance management system 100 when a user makes a browse request to the server 2. Described as an example here is a case where the user U1 browses the appliance data 2111 of the appliance A1. Further, it is presumed that the user U1 has an access right for each of the arrangement information, the operational data, and the statistical data.

In step S121, the user terminal 1 receives an input of a browse request for the appliance data 2111. For instance, the user U1 may activate an application of the appliance management system 100 through the user terminal 1 to display a browse request screen image on the display, and input the browse request by inputting necessary matters thereto. The necessary matters include at least the user ID of the user U1 and the appliance ID of the appliance A1. In addition, the necessary matters may include a desired period for browsing the appliance data 2111 and a desired type of the appliance data 2111.

In step S122, the user terminal 1 generates, on the basis of the input browse request, browse request information and transmits the generated browse request information to the server 2.

In step S241, the first receiving part 221 of the server 2 receives the browse request information. In step S242, the transmitting part 223 checks an access right of the user U1 concerning the appliance A1 with reference to the appliance data DB 211. Here, the transmitting part 223 confirms that the user U1 has the access right for each of the arrangement information, the operational data, and the statistical data of the appliance A1.

In step S243, the transmitting part 223 acquires the appliance data 2111 of the appliance A1 from the appliance data DB 211. Here, the transmitting part 223 acquires the appliance data 2111 indicating the types of the arrangement information, the operational data, and the statistical data.

In step S244, the transmitting part 223 transmits the acquired appliance data 2111 to the user terminal 1.

In step S123, the user terminal 1 receives the appliance data 2111. In step S124, the user terminal 1 displays the appliance data 2111 on the display. Here, the displayed appliance data 2111 includes the appliance data 2111 indicating the types of the arrangement information, the operational data, and the statistical data. When the browse request includes a specific period and a specific type each input by the user U1, the appliance data 2111 in the input period and of the input type is displayed on the display. In this way, the user U1 can browse the appliance data 2111 in the desired period among appliance data 2111 for which the user has the access right.

Figure 7:
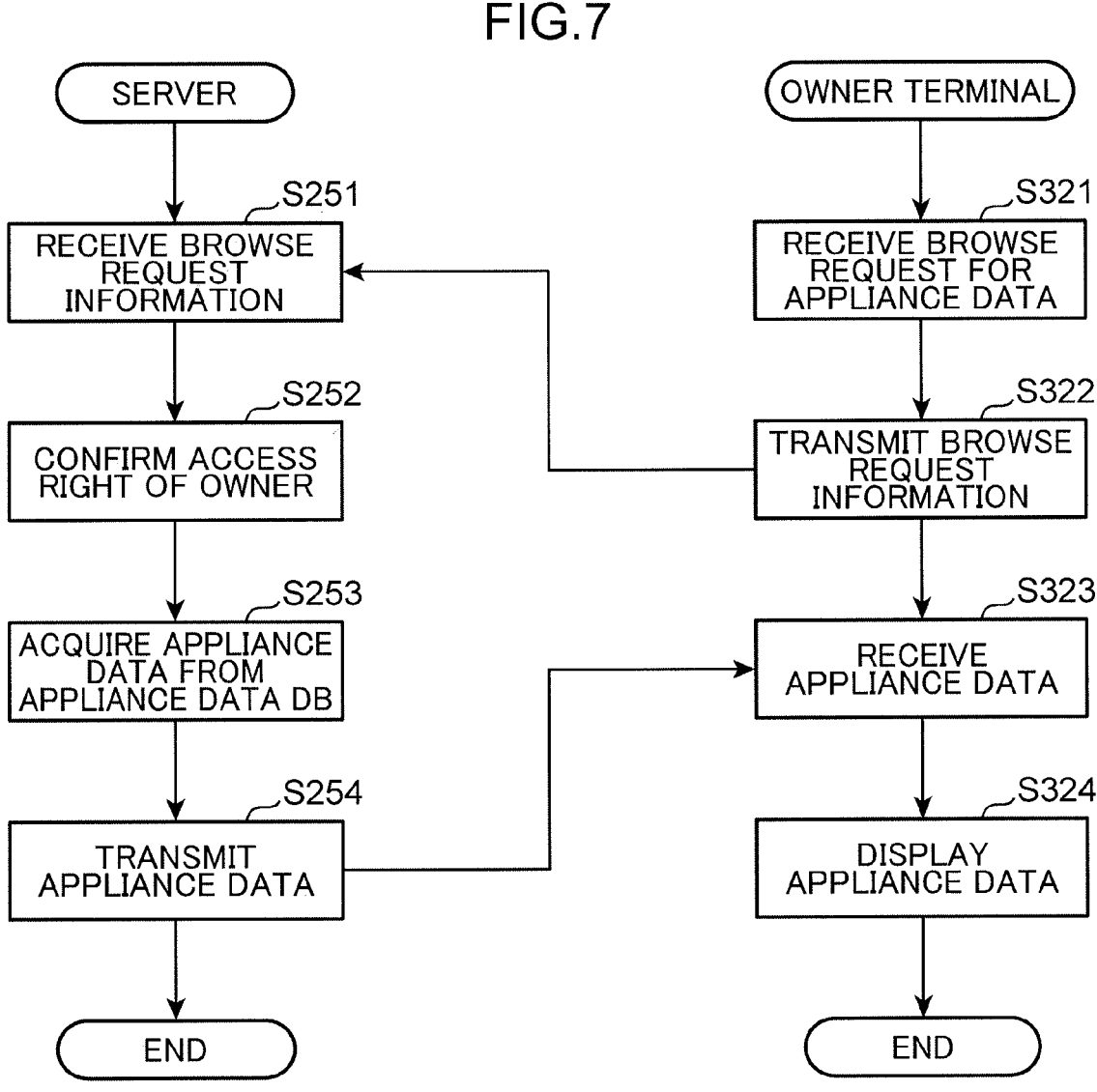
FIG. 7 is a flowchart showing an example of a process by the appliance management system when an owner makes a browse request to the server.

FIG. 7 is a flowchart showing an example of a process by the appliance management system 100 when an owner makes a browse request to the server 2. Described as an example here is a case where the owner O1 browses the appliance data 2111 of the appliance A1. Further, it is presumed that the owner O1 has an access right for each of the arrangement information and the statistical data without an access right for the operational data.

In step S321, the owner terminal 3 receives an input of a browse request for the appliance data 2111. For instance, the owner O1 may activate an application of the appliance management system 100 through the owner terminal 3 to display a browse request screen image on the display, and input the browse request by inputting necessary matters thereto. The necessary matters include at least the owner ID of the owner O1 and the appliance ID of the appliance A1. In addition, the necessary matters may include a desired period for browsing the appliance data 2111 and a desired type of the appliance data 2111.

In step S322, the owner terminal 3 generates, on the basis of the input browse request, browse request information and transmits the generated browse request information to the server 2.

In step S251, the first receiving part 221 of the server 2 receives the browse request information. In step S252, the transmitting part 223 checks an access right of the owner O1 concerning the appliance A1 with reference to the appliance data DB 211. Here, the transmitting part 223 confirms that the owner O1 has the access right for each of the arrangement information and the statistical data of the appliance A1, and that the owner O1 has a restriction on an access right for the operational data of the appliance.

In step S253, the transmitting part 223 acquires the appliance data 2111 of the appliance A1 from the appliance data DB 211. Here, the transmitting part 223 acquires the appliance data 2111 indicating the types of the arrangement information and the statistical data.

In step S254, the transmitting part 223 transmits the acquired appliance data 2111 to the owner terminal 3.

In step S323, the owner terminal 3 receives the appliance data 2111. In step S324, the owner terminal 3 displays the appliance data 2111 on the display. Here, the displayed appliance data 2111 includes the appliance data 2111 indicating the types of arrangement information and statistical data. When the browse request includes a certain period and a certain type each input by the owner O1, the appliance data 2111 in the input period and of the input type is displayed on the display. In this way, the owner O1 can confirm the appliance data 2111 in the desired period among appliance data 2111 for which the owner has the access right.

Conclusively, the appliance management system 100 in the first embodiment gives a restriction on access to the appliance data 2111 by the owner. The system therefore achieves protection of the privacy of the user by preventing the appliance data 2111 from being unconditionally provided to the owner.

Moreover, in response to receipt of the use request information about the appliance 4 from the user terminal 1, approval request information is transmitted to the owner terminal 3, and approval information about use of the appliance 4 is received from the owner terminal 3. In this manner, it is possible to keep a user who cannot obtain an approval of the owner from using the appliance 4.

Second Embodiment

Figure 8:
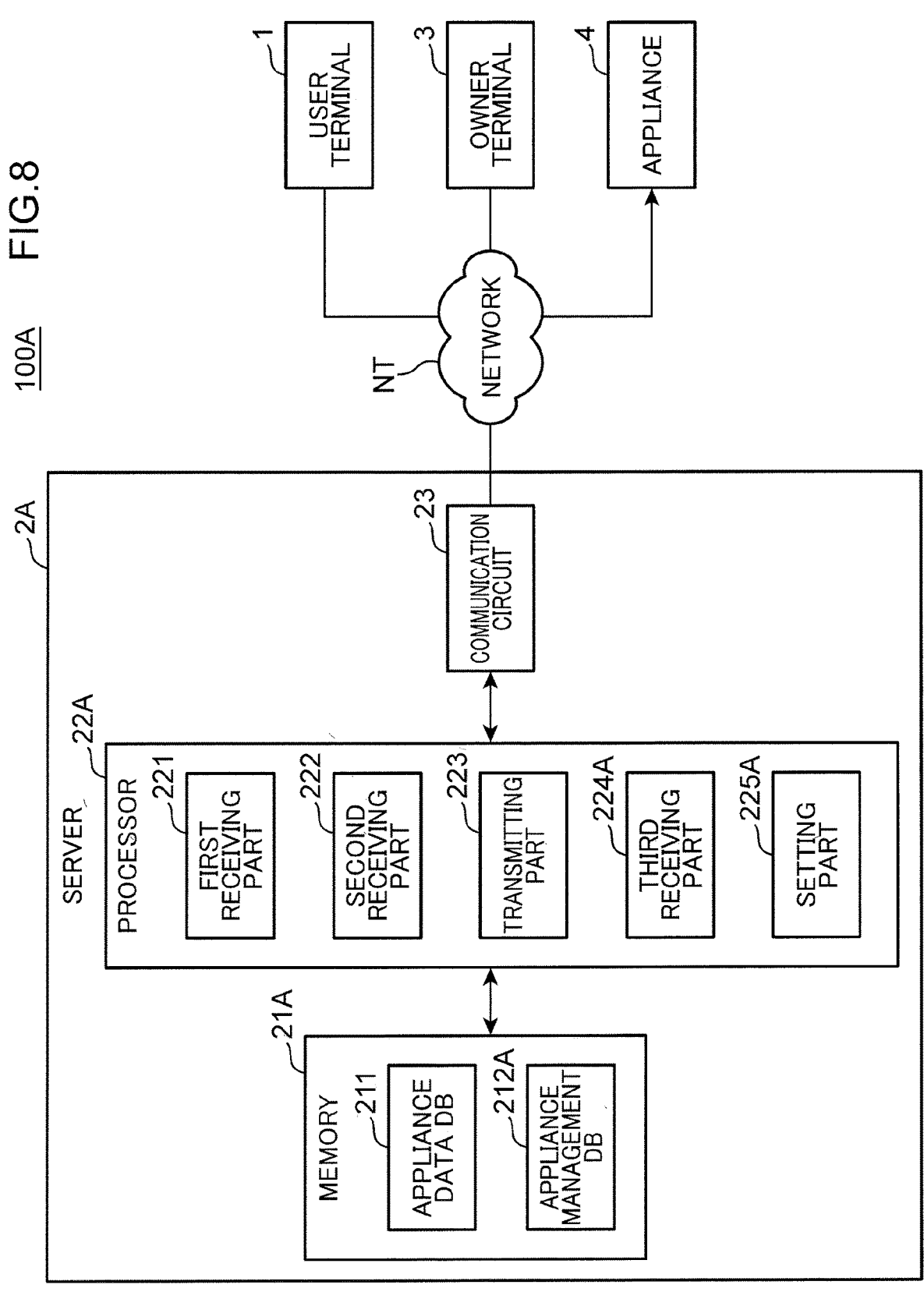
FIG. 8 is a block diagram showing an example of a configuration of an appliance management system in a second embodiment.

A second embodiment has a feature in permitting an owner of a building to give a bulk approval to a plurality of appliances owned by the owner and arranged in the building for a user. FIG. 8 is a block diagram showing an example of a configuration of an appliance management system 100A in the second embodiment. In the second embodiment, constituent elements which are the same as those in the first embodiment are given the same reference numerals and signs, and thus explanation therefor will be omitted.

A memory 21A included in a server 2A has an appliance data DB 211 and an appliance management DB 212A. FIG. 9 shows an example of a data configuration of the appliance management DB 212A in the second embodiment. The appliance management DB 212A includes a plurality of records storing appliance management information 2121A. The appliance management information 2121A additionally included a bulk or non-bulk field in comparison with the appliance management information 2121. The bulk or non-bulk field has registration of information about a bulk approval of the owner to appliances 4. In the example shown in FIG. 9, an owner O1 gives an approval to each of appliances A1, A2, A3 arranged in a building H1 and owned by the owner O1 for a user U1 in a bulk manner.

Referring back to FIG. 8, a processor 22A has a first receiving part 221, a second receiving part 222, a transmitting part 223, a third receiving part 224A, and a setting part 225A.

The third receiving part 224A receives bulk approval information about each appliance 4 from an owner terminal 3 by using a communication circuit 23. The bulk approval information includes first approval information and second approval information.

The first approval information represents an approval to use of the appliance 4 directed to a use request. The second approval represents an approval to use of other appliance 4 arranged in the building except for the appliance 4 directed to the use request. In other words, the bulk approval information represents a bulk approval to both the appliance 4 directed to the use request and the other appliance 4 except for the appliance 4. Here, the bulk approval information may include an appliance list including the other appliance 4.

When use request information about the other appliance 4 is received after the bulk approval information is received, the setting part 225A sets an access right of each of the owner and the user concerning the other appliance 4 without transmitting approval request information about the other appliance 4.

Figure 10:
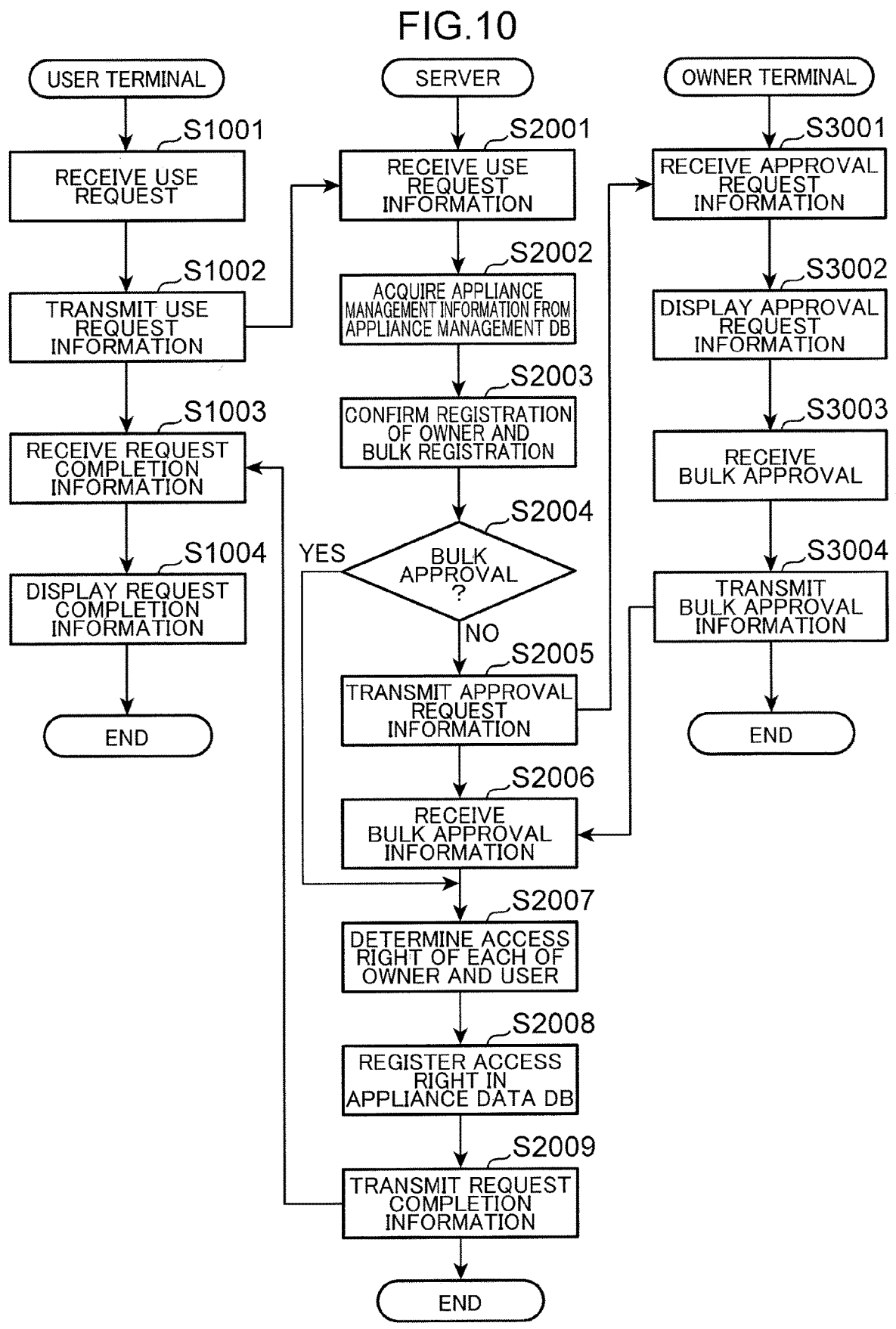
FIG. 10 is a flowchart showing an example of a process by the appliance management system in the second embodiment.

FIG. 10 is a flowchart showing an example of a process by the appliance management system 100A in the second embodiment. Described as an example here is a case where a user U1 makes a use request for the appliance A1 owned by an owner O1. Steps S1001, S1002, S2001, and S2002 are equivalent to steps S101, S102, S201, and S202 in FIG. 4.

In step S2003, the transmitting part 223 confirms whether the appliance management information 2121A acquired from the appliance management DB 212A has registration of an owner ID and further includes information indicating a bulk approval.

When no information indicating the bulk approval is registered (NO in step S2004), the transmitting part 223 transmits approval request information to an owner terminal 3 (step S2005). The approval request information transmitted here includes an appliance list including the other appliance 4 (appliance A2, A3) which is except for the appliance A1 directed to the use request, arranged in the same building as the appliance 4, and owned by the owner O1.

In step S3001, the owner terminal 3 receives the approval request information. In step S3002, the owner terminal 3 displays the approval request information on a display thereof. The displayed approval request information shows, for example, a user ID "U1", an appliance ID "A1", and a building ID "H1". In addition, information requesting the owner O1 to give a bulk approval to the appliance A1 and the other appliance 4 (appliance A2, A3) arranged in the building H1 is displayed. The information requesting the owner O1 to give the bulk approval includes, for example, an appliance list to ask the owner O1 whether to give the bulk approval to the appliance A2 and the appliance A3.

In step S3003, the owner terminal 3 receives an input of a bulk approval from the owner O1. Here, the owner O1 checks display contents of the displayed approval request information, and inputs the bulk approval into the owner terminal 3 when determining the bulk approval to the appliance A1 to A3 for the user U1. The owner O1 may select one of the appliances A2, A3, each serving as an appliance 4, as an appliance 4 to be approved together with the appliance A1 in a bulk manner.

In step S3004, the owner terminal 3 having received the input of the bulk approval transmits bulk approval information to the server 2. When the owner O1 input an access right of each of the owner O1 and the user U1 concerning each of the appliances A1 to A3 at the input of the approval, the bulk approval information includes a set content having been input.

In step S2006, the third receiving part 224 of the server 2 receives the bulk approval information. The third receiving part 224 here registers information indicating the bulk approval in the bulk or non-bulk field for the appliance management information 2121A about each of the appliances A1 to A3. This avoids transmitting a bulk approval request to the owner O1 even when a use request is made for each of the appliances A2, A3 thereafter.

In step S2007, the setting part 225A determines an access right of each of the owner O1 and the user U1 concerning the appliance A1. Details of the determination on the access right is the same as those in the first embodiment.

In step S2004, when the appliance management information 2121A about the appliance 4 directed to the use request has registration of the information indicating the bulk approval (YES in step S2004), the process proceeds to step S2007 without passing through steps S2005, S2006. The determination "YES" in step S2004 is made, for example, in a case where the user U1 makes a use request for the appliance A2 or the appliance A3 after the owner O1 gives the bulk approval to the appliances A1 to A3 in the use request for the appliance A1.

Steps S2008, S2009, S1003, and S1004 are equivalent to steps S207, S208, S103, and S104 in FIG. 4.

Conclusively, according to the second embodiment, the owner can give a bulk approval to use of the other appliance (appliance A2, A3) together with the appliance 4 (appliance A1) directed to the use request from the user in accordance with an approval based on the second approval information.

Moreover, when use request information about the other appliance 4 (appliance A2, A3) is received after the bulk approval information about the appliances A1 to A3 is received, an access right of each of the owner and the user concerning the other appliance 4 is settable without transmitting approval request information about the other device 4 to the owner terminal 3.

Third Embodiment

Figure 11:
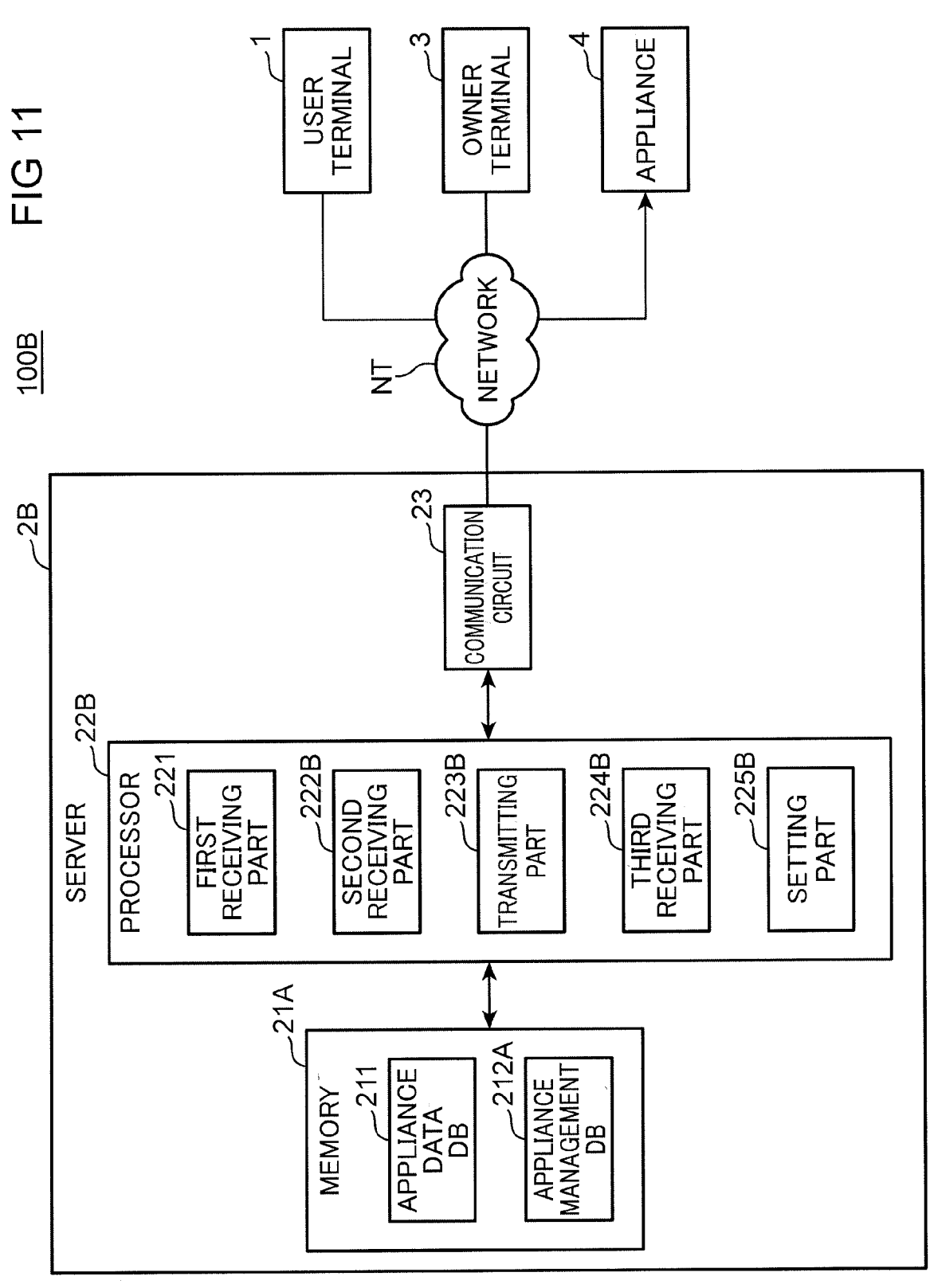
FIG. 11 is a block diagram showing an example of a configuration of an appliance management system in a third embodiment.

A third embodiment has a feature in that a user makes a bulk use request for a plurality of appliances 4 arranged in a building. FIG. 11 is a block diagram showing an example of a configuration of an appliance management system 100B in the third embodiment. In the embodiment, constituent elements which are the same as those in the first and second embodiments are given the same reference numerals and signs, and thus explanation therefor will be omitted.

A server 2B includes a memory 21A, a processor 22B, and a communication circuit 23. The processor 22B has a first receiving part 221, a second receiving part 222B, a transmitting part 223B, a third receiving part 224B, and a setting part 225B.

The second receiving part 222B receives demand information about an appliance list from a user terminal 1 by using the communication circuit 23. The appliance list represents information about a plurality of appliances 4 for which the user can make a bulk use request.

The transmitting part 223B transmits the appliance list to the user terminal 1 in response to receipt of the demand information by the second receiving part 222B. The appliance list is presented to the user.

The second receiving part 222B receives, by using the communication circuit 23, bulk use request information transmitted from the user terminal 1 to make a use request for the appliances 4 included in the appliance list in a bulk manner.

The third receiving part 224B receives bulk approval information from an owner terminal 3.

The setting part 225B sets, on the basis of the bulk approval information, an access right of each of the user and the owner concerning the appliances 4 directed to the bulk use request.

Figure 12:
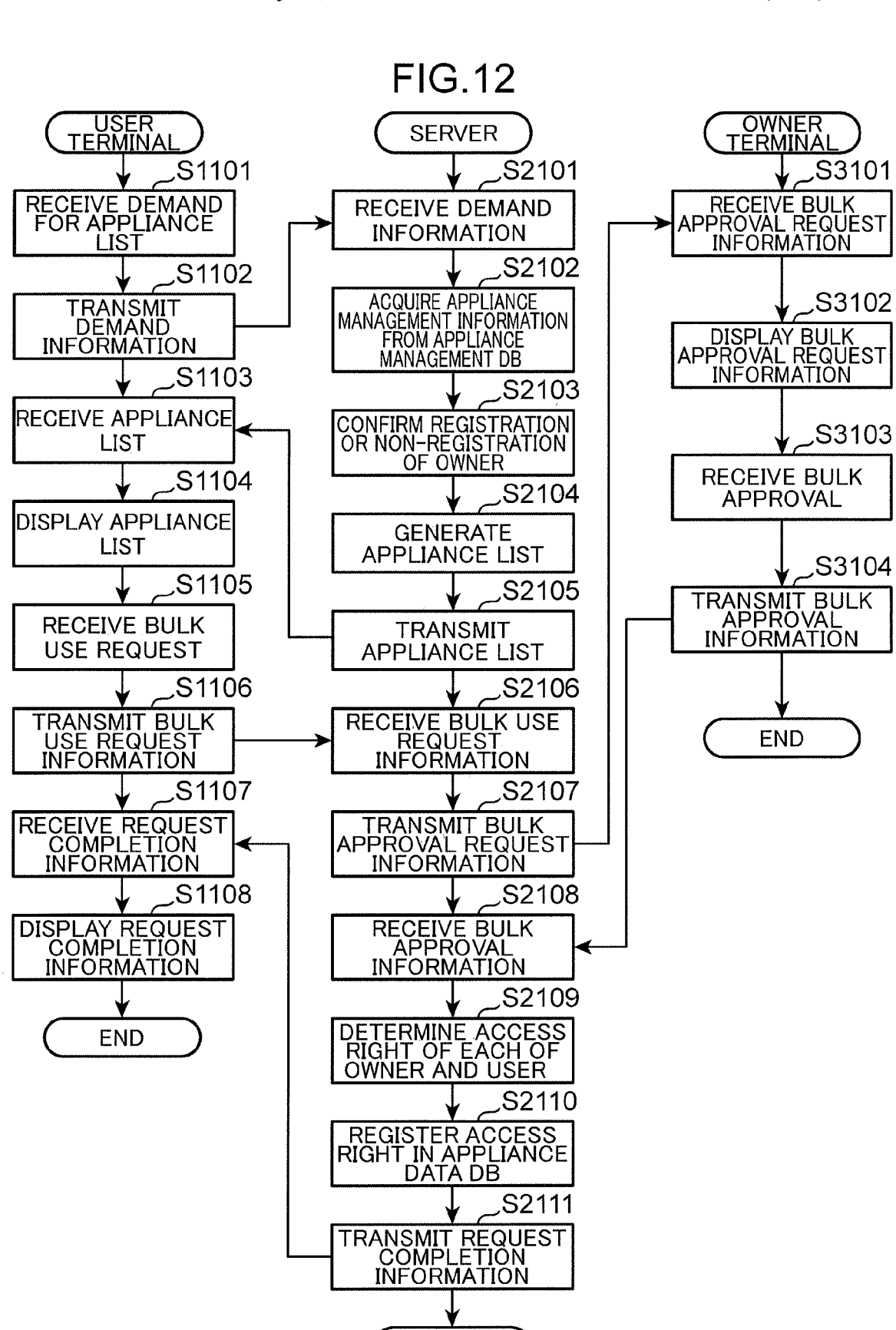
FIG. 12 is a flowchart showing an example of a process by the appliance management system in the third embodiment.

FIG. 12 is a flowchart showing an example of a process by the appliance management system 100B in the third embodiment. Described as an example here is a case where a user U1 makes a bulk use request for appliances A1 to A3 owned by an owner O1.

In step S1101, the user terminal 1 receives an input of a demand for an appliance list from the user U1. Here, the user U1 may activate an application of the appliance management system 100 to display a demand screen image of the appliance list on a display, and input the demand for the appliance list by inputting necessary matters thereto. The necessary matters include at least a user ID of the user U1 and a building ID of a building H1. In step S1102, the user terminal 1 transmits demand information to the server 2.

In step S2101, the second receiving part 222B of the server 2 receives the demand information. In step S2102, the transmitting part 223B acquires, from an appliance management DB 212A, appliance management information 2121A about each appliance 4 arranged in the building H1. Here, the transmitting part 223B acquires only the appliance management information 2121A including information indicating availability of a bulk approval among the appliance management information 2121A relevant to the building H1. In the embodiment, it is presumed that the appliance management DB 212 has registration of the information indicating the availability of the bulk approval in advance under permission of the owner O1. Here, the appliance management information 2121A about each of the appliances A1 to A3 is acquired.

In step S2103, the transmitting part 223B confirms whether the acquired appliance management information 2121A about each of the appliances A1 to A3 has registration of an owner ID. Here, it is presumed that the acquired appliance management information 2121A has registration of the owner ID of the owner O1 for each of the appliances A1 to A3.

In step S2104, the transmitting part 223B generates an appliance list including the appliances A1 to A3. In step S2105, the transmitting part 223B transmits the appliance list to the user terminal 1 of the user U1.

In step S1103, the user terminal 1 receives the appliance list. In step S1104, the user terminal 1 displays the appliance list. The appliance list displayed here includes information about the appliances A1 to A3.

In step S1105, the user terminal 1 receives an input of a bulk use request from the user having browsed the appliance list. Here, a bulk use request for the appliances A1 to A3 is input.

In step S1106, the user terminal 1 transmits bulk use request information indicating the input bulk use request to the server 2. The bulk use request information here includes the appliance list including an appliance ID of each of the appliances A1 to A3 and the user ID of the user U1.

In step S2106, the second receiving part 222B of the server 2 receives the bulk use request information. In step S2107, the transmitting part 223B transmits bulk approval request information to the owner terminal 3. Here, the bulk approval request information includes the appliance list showing the appliance ID of each of the appliances A1 to A3 directed to the bulk use request, and the user ID of the user U1. Besides, the bulk approval request information is transmitted to the owner terminal 3 of the owner O1 confirmed in step S2103.

In step S3101, the owner terminal 3 receives the bulk approval request information. In step S3102, the owner terminal 3 displays the bulk approval request information on a display thereof. The displayed bulk approval request information includes the appliance list including the appliances A1 to A3, and the user iD of the user U1.

In step S3103, the owner terminal 3 receives an input of a bulk approval. Here, the owner O1 browses display contents of the displayed bulk approval request information, and determines whether the user is valid. When the user is determined as valid, the owner O1 inputs a bulk approval to the owner terminal 3. When a refusal is input concerning the bulk approval, information indicating the refusal against the use request is transmitted to the user terminal 1 of the user U1 via the server 2.

In step S3104, the owner terminal 3 having received the input of the bulk approval transmits bulk approval information to the server 2.

In step S2108, the third receiving part 224B of the server 2 receives the bulk approval information. In step S2109, the setting part 225B determines an access right of each of the owner and the user. Here, the setting part 225B sets an access right of each of the owner and the user concerning each of the appliances A1 to A3 in a bulk manner.

In step S2110, the setting part 225B registers the determined access right in the appliance data DB 211. For instance, concerning each of the appliances A1 to A3, the setting part 225 registers the owner O1 and the user U1 in an access right field for arrangement information and statistical data, and registers only the user U1 in an access right field for operational data.

Steps S2111, S1107, and S1108 are equivalent to steps S208, S103, and S104 in FIG. 4.

Conclusively, according to the third embodiment, the appliance list is presented to the user, and thus, the user can make a bulk use request for appliances 4 included in the appliance list.

Fourth Embodiment

Figure 13:
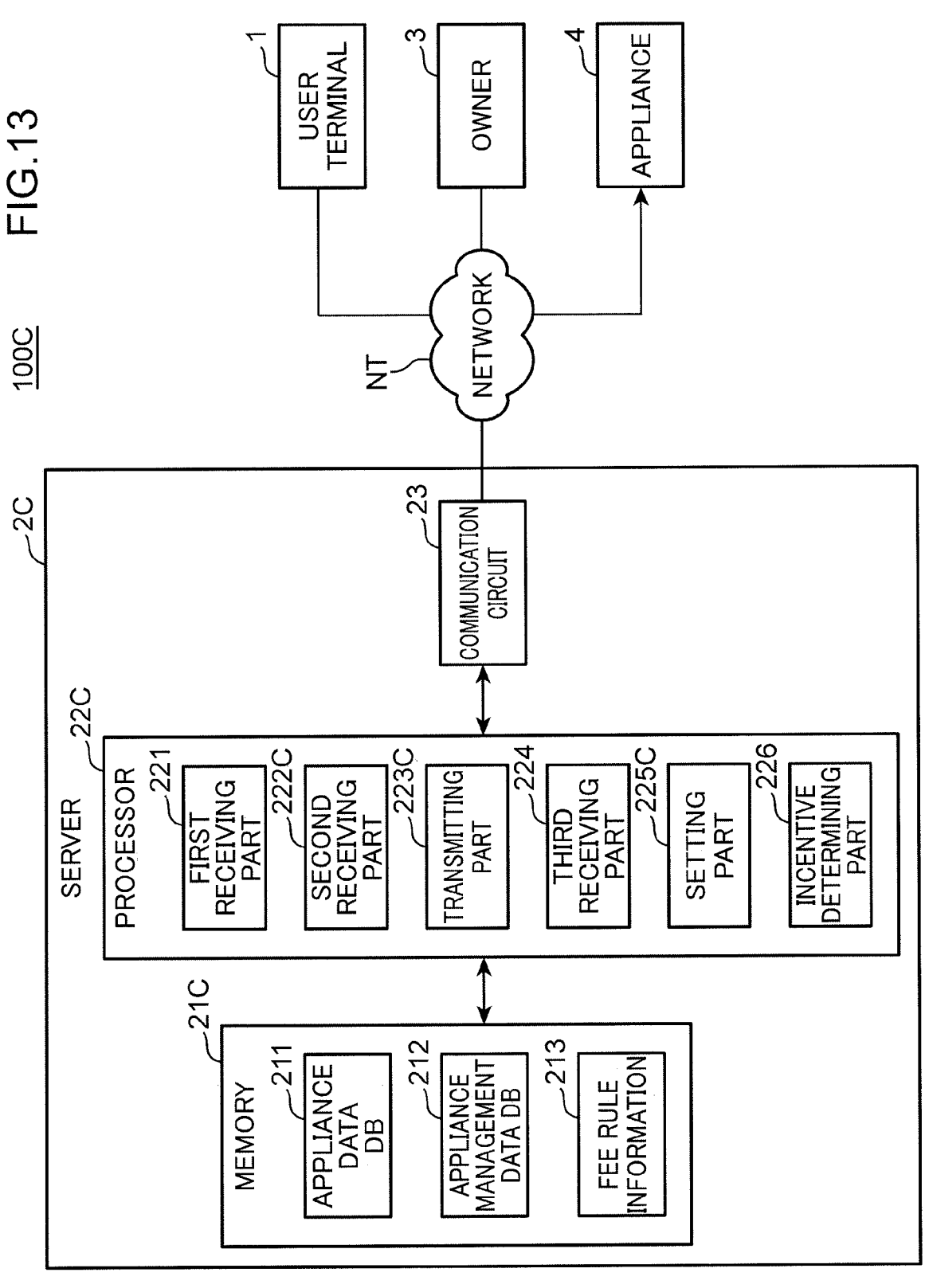
FIG. 13 is a block diagram showing an example of a configuration of an appliance management system in a fourth embodiment.

A fourth embodiment is aimed at allowing a user to select a type of appliance data to permit access thereto by an owner, and giving an incentive to the user in accordance with a selection result. FIG. 13 is a block diagram showing an example of a configuration of an appliance management system 100C in the fourth embodiment. In the fourth embodiment, constituent elements which are the same as those in the first to third embodiments are given the same reference numerals and signs, and thus explanation therefor will be omitted.

A processor 22C included in a server 2C has a first receiving part 221, a second receiving part 222C, a transmitting part 223C, a third receiving part 224, a setting part 225C, and an incentive determining part 226.

The transmitting part 223C transmits permission request information to a user terminal 1 by using a communication circuit 23 in response to receipt of use request information by the second receiving part 222. The permission request information is intended to ask the user about a type of the data, among types of data included in appliance data 2111, to permit access thereto by the owner. In the embodiment, the user is allowed to select a type to permit access thereto by the owner among types of the appliance data 2111 to which access by the owner is permitted in advance. An adoptable type of the appliance data 2111 to which the access by the owner is permitted in advance includes a type (maintenance type) related to maintenance information about the appliance 4. Examples of the maintenance type include: arrangement information; error information, damage information, and appliance control information forming operational data; and statistical data. Therefore, the user selects a type of the appliance data 2111 to permit access thereto by the owner from the maintenance types.

The second receiving part 222C receives, from the user terminal 1, a permission setting type which is a type of data, among types of the appliance data 2111, selected by the user having browsed the permission request information to permit the access thereto by the owner.

When the third receiving part 224 receives approval information, the setting part 225C sets an access right of the owner for the appliance data 2111 in accordance with the permission setting type received by the second receiving part 222C. The setting of the access right includes a restriction on access by the owner, and permission of access by the owner.

The incentive determining part 226 determines an incentive to be given to the user in accordance with the permission of the access to the data of the maintenance type by the owner. The incentive determining part 226 transmits the determined incentive to the user terminal 1. The incentive is presented to the user via the user terminal 1.

In the embodiment, a discount on a common service fee of the building is adopted as the incentive. The incentive determining part 226 calculates a common service fee resulting from the discount made in accordance with a fee rule indicated by fee rule information 213 stored in a memory 21C. Adoptable examples of the fee rule include a rule that a discount rate is increased as the number of permission setting types increases. Described as an example here is a case where a user U1 makes a use request for an appliance A1 owned by an owner O1.

Figure 14:
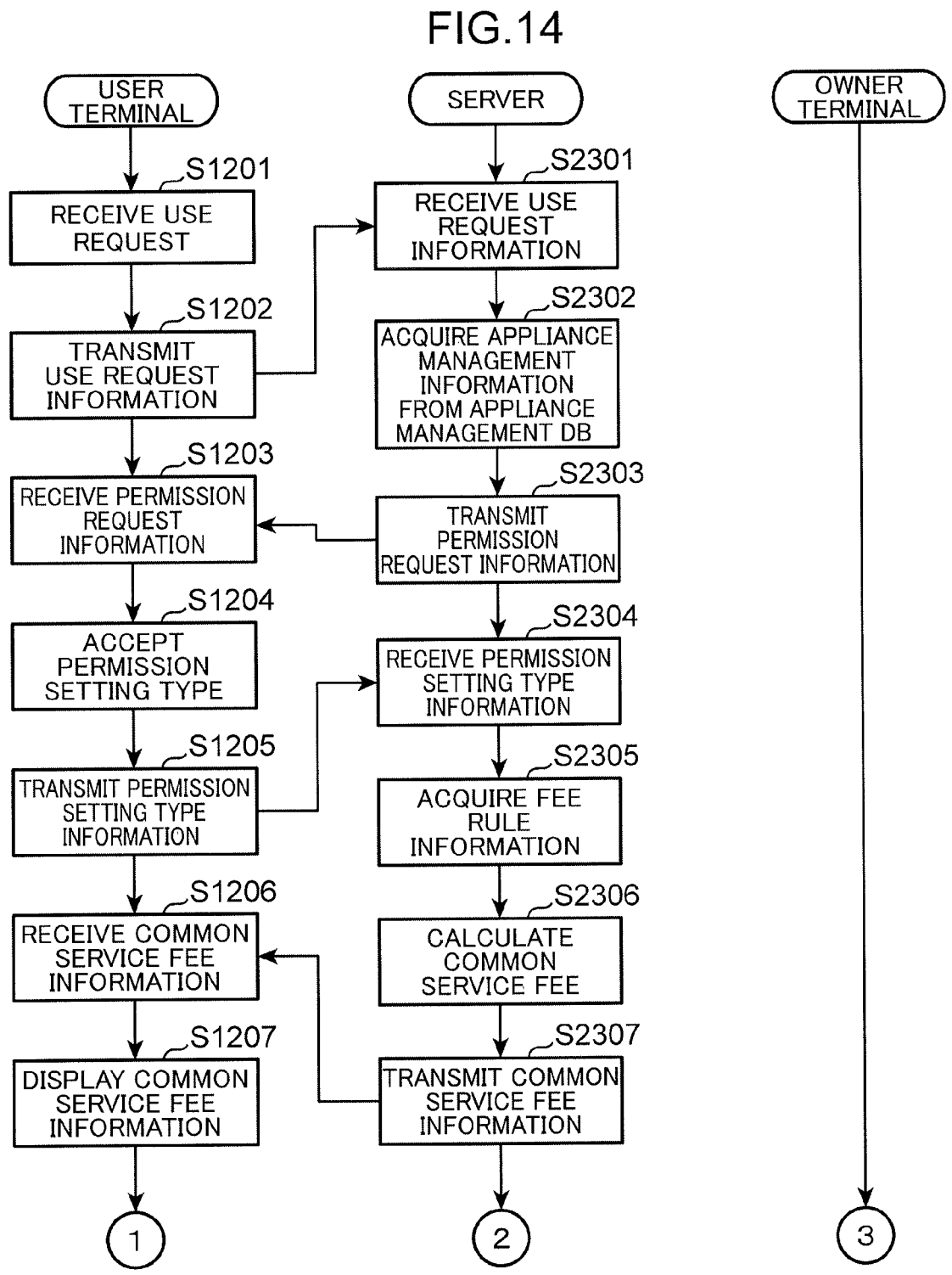
FIG. 14 is a flowchart showing an example of a process by the appliance management system in the fourth embodiment.

FIG. 14 is a flowchart showing an example of a process by the appliance management system 100C in the fourth embodiment. Steps S1201, S1202, S2301, and S2302 are equivalent to steps S101, S102, S201, and S202 in FIG. 4.

In step S2303, the transmitting part 223C of the server 2C transmits permission request information to the user terminal 1 of the user U1. The permission request information includes a maintenance type list about the appliance A1 and an owner ID of the owner O1.

In step S1203, the user terminal 1 receives the permission request information and displays the received permission request information on a display thereof. FIG. 16 shows a display screen image G1 of the permission request information. The display screen image G1 shows a message encouraging the user to select a maintenance type to permit access thereto by the owner. The display screen image G1 further shows the name of the owner O1 of the appliance A1.

Besides, the display screen image G1 shows a list including selectable maintenance types. Here, arrangement information, error information, damage information, appliance control information, and statistical data are displayed as the selectable maintenance types. Moreover, the display screen image G1 has check boxes 1601 associated with the respective maintenance types. The user U1 inputs a check mark in the check box 1601 associated with a certain maintenance type to permit access thereto by the owner O1 among the maintenance types. In this manner, the user U1 can select a specific permission setting type.

In step S1204, the user terminal 1 accepts selection of the permission setting type by the user U1 having browsed the display screen image G1. In step S1205, the user terminal 1 transmits, to the server 2C, permission setting type information indicating the selected permission setting type.

In step S2304, the second receiving part 222C of the server 2C receives the permission setting type information. In step S2305, the incentive determining part 226 acquires fee rule information 213 from the memory 21C. In step S2306, the incentive determining part 226 determines a discount rate corresponding to the number of maintenance types selected by the user and indicated by the permission setting type information with reference to the fee rule information 213, calculates a discount amount by multiplying the determined discount rate by a default common service fee of the building, subtracts the discount amount from the default common service fee, and calculates a common service fee.

In step S2307, the incentive determining part 226 transmits common service fee information indicating the calculated common service fee to the user terminal 1. The common service fee information includes, for example, the default common service fee and the discount amount in addition to the discounted common service fee.

In step S1206, the user terminal 1 receives the common service fee information. In step S1207, the user terminal 1 displays the common service fee information on a display. Consequently, the user U1 can confirm the given incentive.

Figure 15:
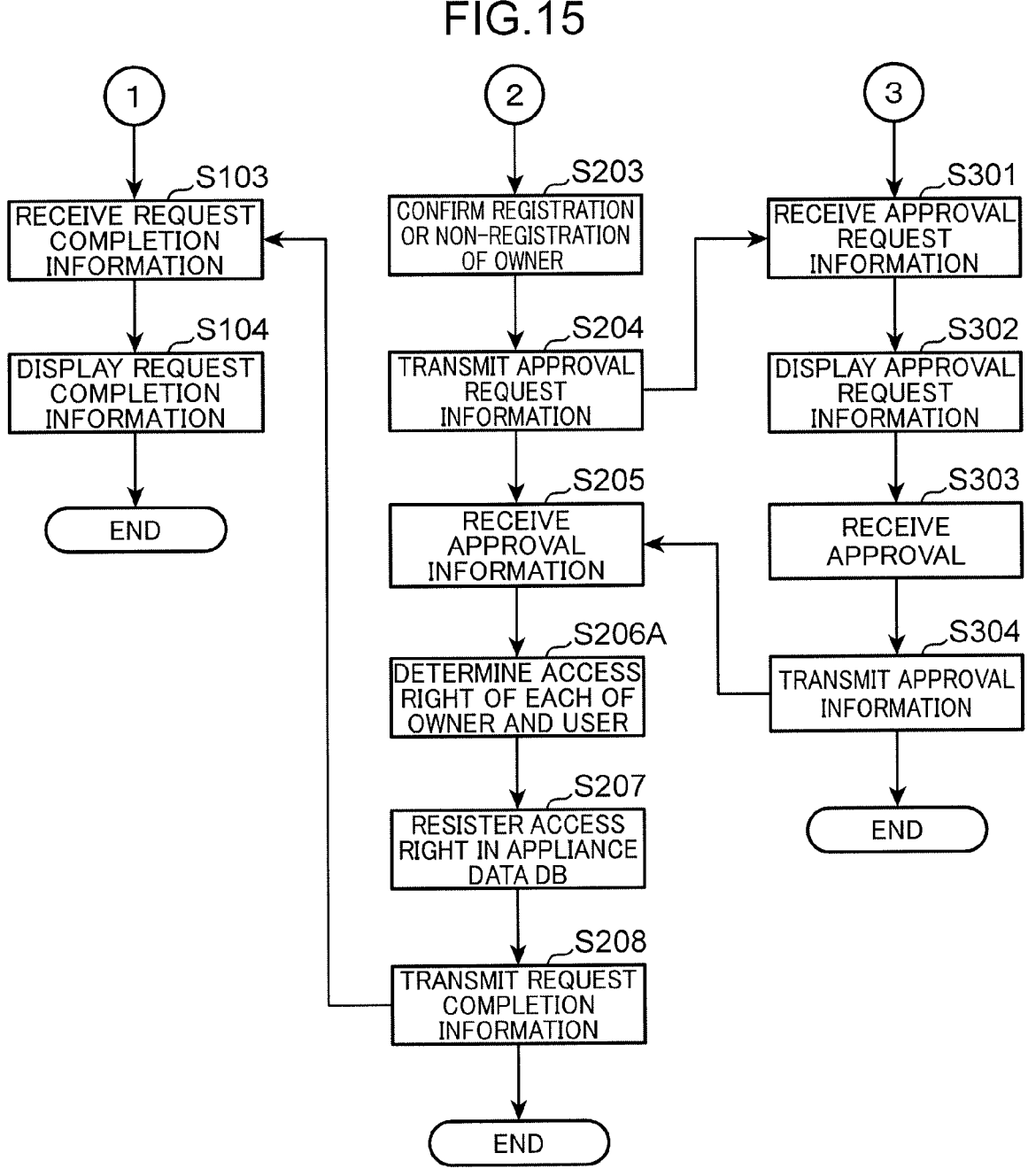
FIG. 15 is a flowchart which is continuous from FIG. 14.

FIG. 15 is a flowchart which is continuous from FIG. 14. In FIG. 15, steps which are the same as those in FIG. 4 are given the same reference numerals and signs. FIG. 15 differs from FIG. 4 in step S206A. In step S206A, the setting part 225C determines an access right of each of the owner and the user. Here, regarding the access right of the owner, the setting part 225C gives permission of access to a maintenance type, which is selected by the user and indicated by the permission setting type information, by the owner, and gives a restriction on access to the remaining maintenance types by the owner. Meanwhile, the setting part 225C may permit or restrict access to other types except for the maintenance types among the types of the appliance data 2111 by the owner in accordance with a predetermined setting rule.

Conclusively, according to the fourth embodiment, types of the appliance data 2111 are presented to the user, and a permission setting type of data which is a type of data, among presented types, to which access by the owner is permitted is received from the user terminal 1. In this way, the user can set a type of data, among the presented types of data, to permit access thereto by the owner. This makes it possible to protect the privacy of the user while honoring a wish of the user.

In addition, this configuration gives an incentive to the user in accordance with the permission of the access to the data of the maintenance type by the owner, and therefore, can motivate the user to permit access to the data by the owner. Consequently, the owner has an increased possibility of having permission of access to the data of the maintenance type, and thus attains facilitated management of the appliance.

Fifth Embodiment

A fifth embodiment is aimed at giving a restriction, in accordance with a permission setting type of an appliance 4 directed to a use request, on access to other appliance 4 arranged in the same building as the appliance 4 by an owner. The fifth embodiment adopts the same block diagram and flowcharts as those adopted in the fourth embodiment. Accordingly, FIG. 13, FIG. 14, and FIG. 15 are referred to.

In the embodiment, the permission setting type is set from use data. The use data includes, for example, appliance control information and manipulation history information forming operational data. The appliance control information and the manipulation history information included in the use data may be represented by operational data received from the appliance 4 or processed data based on the received operational data.

In the embodiment, a setting part 225C sets a restriction on access to appliance data 2111 of the other appliance 4 by the owner in accordance with the permission setting type, the other appliance 4 being owned by the same owner as that of the appliance 4 directed to the use request and arranged in the building.

Next, a process by an appliance management system 100C in the fifth embodiment will be described with reference to FIG. 14 and FIG. 15. Described as an example here is a case where a user U1 makes a use request for an appliance A1 owned by an owner O1.

Figure 17:
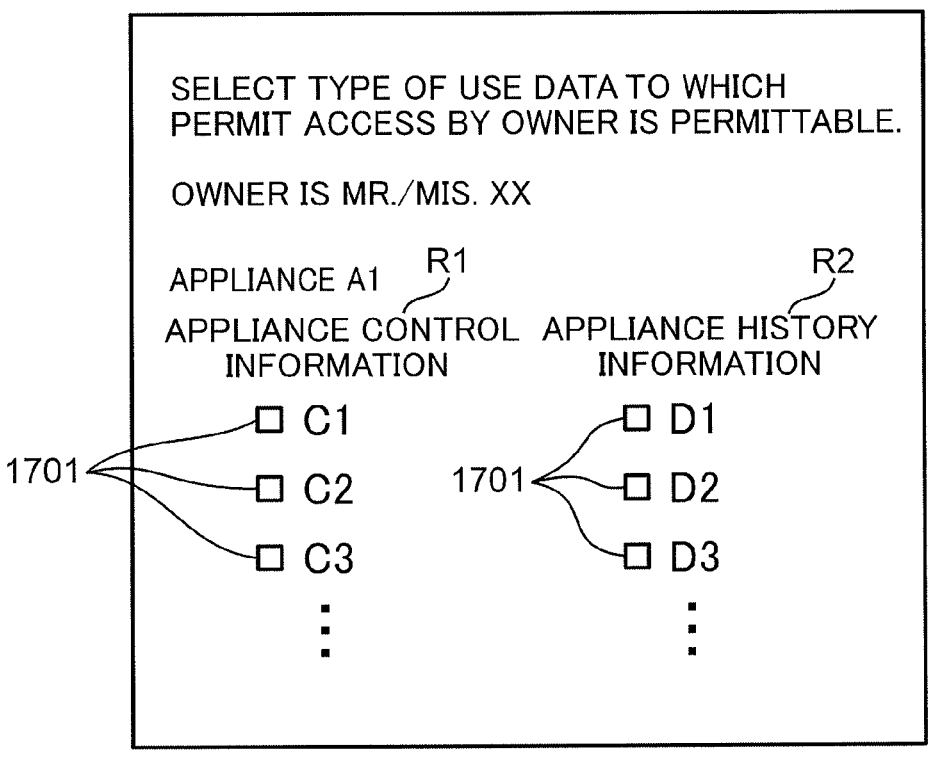
FIG. 17 shows a display screen image of permission request information in a fifth embodiment.

In step S1203, a user terminal 1 displays a display screen image of permission request information on a display as described below. FIG. 17 shows a display screen image G2 of the permission request information in the fifth embodiment. The display screen image G2 shows a list of types of data to which access by the owner O1 is permitted among use data of the appliance A1 owned by the owner O1.

In detail, the display screen image G2 shows a section R1 for appliance control information and a section R2 for appliance history information. The section R1 for the appliance control information shows types (detailed types) of data in detail about the appliance control information in a list form. Here, the detailed types of the appliance control information are simply displayed as C1, C2, C3 . . . in a list form for convenience of explanation. Moreover, in the section R2 of the appliance history information, the detailed types of the appliance history information are simply displayed as D1, D2, D3 in a list form as well.

The display screen image G2 has check boxes 1701 associated with the respective detailed types. The user U1 inputs a check mark in the check box 1701 associated with a certain detailed type to permit access thereto by the owner O1 among the detailed types. In this manner, the user U1 can select a specific permission setting type of the appliance A1.

In step S1204, the user terminal 1 accepts selection of the permission setting type by the user U1 having browsed the display screen image G2. In step S1205, the user terminal 1 transmits, to the server 2C, permission setting type information indicating the selected permission setting type.

Thereafter, the processes shown in FIG. 14 and FIG. 15 are executed, and approval information is transmitted from the owner terminal 3 of the owner O1 having inputted an approval. When the third receiving part 224 receives the approval information, the setting part 225C determines an access right of each of the owner and the user (step S206A). Here, in accordance with the permission setting type information about the appliance A1, the setting part 225C sets an access right of each of the owner O1 and the user U1 concerning the appliance A1 and further sets an access right of each of the owner O1 and the user U1 concerning each of the other appliances A2, A3 in the building H1 owned by the owner O1.

Specifically, the setting part 225C gives permission of access, by the owner O1, to a detailed type of each of the appliances A2, A3 having the same attribute as the detailed type of the appliance A1 to which the user U1 permits access by the owner O1. Contrarily, the setting part 225C gives a restriction on access, by the owner O1, to a detailed type of each of the appliances A2, A3 having the same attribute as the detailed type of the appliance A1 to which the user U1 gives a restriction on access by the owner O1. Here, the setting part 225C may set an access right of the user U1 on the basis of the predetermined setting rule or a set content by the owner O1 at giving the approval.

As described heretofore, according to the fifth embodiment, a restriction on access to the other appliance 4 by the owner is given in accordance with the permission setting type set for the appliance 4 directed to the use request. Therefore, the setting of the permission setting type of the appliance 4 directed to the use request is applicable to the other appliance 4 as well. This achieves a bulk setting of the permission setting type.

In step S1204 in the fifth embodiment, the user terminal 1 may display a detailed type to permit access thereto by the owner concerning each of the appliances A2, A3 on the display of the user terminal 1 under the control by the transmitting part 232C.

FIG. 18 shows a display screen image G3 displayed on the display of the user terminal 1 to present the detailed type determined concerning each of the other appliances A2, A3 to the user U1. The display screen image G3 is displayed on the user terminal 1 when, for example, the user U1 completes the manipulation of selecting the detailed type of the appliance A1 on the display screen image G2.

The display screen image G3 shows a message indicating setting of the same access right concerning each of the appliances A2, A3 as the access right concerning the appliance A1. The display screen image G3 shows detailed types to which access by the owner O1 is permitted and detailed types to which access by the owner O1 is restricted concerning each of the appliances A2, A3. The underlined type denotes each detailed type to which access is restricted.

On the display screen image G3, each of the detailed types denoted by the signs C1, C2, . . . and D1, D2, . . . means that each detailed type has the same attribute as the attribute of the corresponding detailed type of the appliance A1 denoted by the same sign.

In this example, the user U1 permits access to some detailed types (C1, C2, D1, D2) by the owner O1, but gives a restriction on access to other detailed types (C3, D3) by the owner O1 concerning the appliance A1, and thus the other detailed types (C3, D3) are underlined concerning the appliances A2, A3. A strikethrough line may be adopted in place of the underline.

The user U1 having browsed the display screen image G3 can appropriately change a detailed type to which access by the owner O1 is permitted and a detailed type to which access by the owner is restricted concerning each of the appliances A2, A3.

For instance, when restricting the access to a detailed type (C1) of the appliance A2, the user U1 touches a display region of the detailed type (C1) of the appliance A2 on the display screen image G3. In response to this, the detailed type (C1) of the appliance A3 is displayed with an underline.

For instance, when permitting access to the detailed type (C3) of the appliance A2, the user U1 touches a display region of the detailed type (C3) of the appliance A2 on the display screen image G3. In response to this, the underline of the detailed type (C3) of the appliance A2 is deleted.

The user U1 touches an unillustrated agreement button on the display screen image G3 when completing a work of confirming or a work of changing the access right concerning each of the appliances A2, A3.

In this manner, permission setting information reflecting the confirmation work or the change work by the user U1 is transmitted from the user terminal 1 to the server 2C. Then, the setting part 225C of the server 2C sets the access right of the owner O1 concerning each of the appliances A1 to A3 in accordance with the permission setting information about each of the appliances A1 to A3.

This disclosure can adopt modifications described below.

(1) A whole of or part of the respective blocks included in the processor 22 and the memory 21C in server 2 in FIG. 1 may be provided in the user terminal 1 or in the owner terminal 3. This is applicable to the blocks in each of FIG. 8, FIG. 11, and FIG. 13.

(2) In the second embodiment, an access right of an owner of other appliance 4, e.g., appliance A2, may be set without transmission of approval request information to the owner terminal 3 only for a use request made for the appliance A2 in a predetermined period after the owner gives a bulk approval to the appliances A1 to A3. Adoptable examples of the predetermined period may include an appropriate period of one week, a half month, and one month.

(3) In step S302 shown in FIG. 15, the use request information displayed on the owner terminal 3 may include a permission setting type. This allows the owner O1 to confirm a detailed type to which the user U1 permits access by the owner O1. Moreover, the use request information displayed in step S302 in the fifth embodiment may include a permission setting type of each of the appliances A2, A3 owned by the owner O1 in addition to the permission setting type of the appliance A1 directed to the use request. This allows the owner O1 to confirm each permission setting type of all the appliances A1 to A3 owned by the owner in the building H1. For this purpose, the transmitting part 233 may cause the approval request information transmitted to the owner terminal 3 to include each permission setting type of each of the appliances A1 to A3.

(4) The incentive is not limited to a discount on a common service fee, and may be, for example, a discount on an electricity rate or grant of a coupon to the user. The coupon may include mileage reward points and points in an online shopping site or a shopping mall.

(5) Although the fifth embodiment includes a configuration where a user selects a detailed type of use data, this is a mere example. For instance, the user may select a type to permit access thereto by the owner from arrangement information, operational data, and statistical data.

This disclosure is useful in a rental service of renting a building where an appliance is arranged to a user.

The invention claimed is:

1. An information processing method, by a computer, comprising:
   receiving, from an appliance arranged in a building, operational data of the appliance;
   receiving use request information indicating a use request for the appliance from a user terminal belonging to a user of the appliance;
   transmitting approval request information to an owner terminal belonging to an owner of the appliance in response to receipt of the use request information;
   receiving, from the owner terminal, approval information indicating an approval to use of the appliance;
   setting a restriction on access to appliance data by the owner in response to receipt of the approval information, the appliance data including at least one of the operational data and data based on the operational data;
   receiving demand information about a list including the appliance from the user terminal;
   transmitting the list including the appliance to the user terminal in response to the demand information;
   presenting the list including the appliance to the user via the user terminal; and
   receiving, when receiving the use request information, use request information about an appliance included in the list including the appliance.

2. An information processing method, by a computer, comprising:
   receiving, from an appliance arranged in a building, operational data of the appliance;
   receiving use request information indicating a use request for the appliance from a user terminal belonging to a user of the appliance;
   transmitting approval request information to an owner terminal belonging to an owner of the appliance in response to receipt of the use request information;
   receiving, from the owner terminal, approval information indicating an approval to use of the appliance; and
   setting a restriction on access to appliance data by the owner in response to receipt of the approval information, the appliance data including at least one of the operational data and data based on the operational data;
   transmitting a type of data contained in the appliance data to the user terminal;
   presenting the type to the user via the user terminal;
   receiving, from the user terminal, a permission setting type which is a type of data, among types of data, to which access by the owner is permitted; and
   setting the restriction on access to the appliance data by the owner in accordance with the permission setting type.

3. The information processing method according to claim 2, wherein the type transmitted to the user terminal includes a type of data which is in the appliance data and to which access by the owner is permitted.

4. The information processing method according to claim 3, wherein the permission setting type includes a maintenance type which is a type of data for use in maintenance of the appliance, and
   the restriction on access includes permission of access to the data of the maintenance type by the owner.

5. The information processing method according to claim 4, further comprising:
   determining an incentive to be given to the user in accordance with the permission of the access to the data of the maintenance type by the owner;
   transmitting the incentive to the user terminal; and
   presenting the incentive to the user via the user terminal.

6. The information processing method according to claim 2, further comprising:
   receiving the permission setting type from the user terminal; and
   setting, in accordance with the permission setting type, a restriction on access to appliance data of the other appliance by the owner, the other appliance being arranged in the building except for the appliance directed to the use request.

7. An information processing system comprising:
   a processor, in cooperation with a memory, performs operations including:
   receiving, from an appliance arranged in a building, operational data of the appliance;

receiving use request information indicating a use request for the appliance from a user terminal belonging to a user of the appliance;

transmitting approval request information to an owner terminal belonging to an owner of the appliance in response to receipt of the use request information;

receiving, from the owner terminal, approval information indicating an approval to use of the appliance;

setting a restriction on access to appliance data by the owner in response to receipt of the approval information, the appliance data including at least one of the operational data and data based on the operational data;

receiving demand information about a list including the appliance from the user terminal;

transmitting the list including the appliance to the user terminal in response to the demand information;

presenting the list including the appliance to the user via the user terminal; and receiving, when receiving the use request information, use request information about an appliance included in the list including the appliance.

8. An information processing system comprising:

a processor, in cooperation with a memory, performs operations including:

receiving, from an appliance arranged in a building, operational data of the appliance;

receiving use request information indicating a use request for the appliance from a user terminal belonging to a user of the appliance;

transmitting approval request information to an owner terminal belonging to an owner of the appliance in response to receipt of the use request information;

receiving, from the owner terminal, approval information indicating an approval to use of the appliance;

setting a restriction on access to appliance data by the owner in response to receipt of the approval information, the appliance data including at least one of the operational data and data based on the operational data;

transmitting a type of data contained in the appliance data to the user terminal;

presenting the type to the user via the user terminal;

receiving, from the user terminal, a permission setting type which is a type of data, among types of data, to which access by the owner is permitted; and setting the restriction on access to the appliance data by the owner in accordance with the permission setting type.

*     *     *     *     *